United States Patent
Xu et al.

(10) Patent No.: US 12,343,625 B2
(45) Date of Patent: Jul. 1, 2025

(54) REFRESH RATE SWITCHING METHOD AND ELECTRONIC DEVICE

(71) Applicant: HUAWEI TECHNOLOGIES CO., LTD., Guangdong (CN)

(72) Inventors: Jun Xu, Shanghai (CN); Yu Li, Shanghai (CN); Liang Wang, Shanghai (CN); Rui Ning, Shanghai (CN); Qiangguo Jiang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 408 days.

(21) Appl. No.: 17/908,626

(22) PCT Filed: Mar. 2, 2021

(86) PCT No.: PCT/CN2021/078682
§ 371 (c)(1),
(2) Date: Sep. 1, 2022

(87) PCT Pub. No.: WO2021/175213
PCT Pub. Date: Sep. 10, 2021

(65) Prior Publication Data
US 2023/0134189 A1    May 4, 2023

(30) Foreign Application Priority Data
Mar. 6, 2020 (CN) .................... 202010153662.8

(51) Int. Cl.
A63F 13/525 (2014.01)
G09G 3/00 (2006.01)

(52) U.S. Cl.
CPC .......... *A63F 13/525* (2014.09); *G09G 3/035* (2020.08); *G09G 2330/02* (2013.01); *G09G 2340/0435* (2013.01); *G09G 2354/00* (2013.01)

(58) Field of Classification Search
CPC .............. G09G 3/035; G09G 2330/02; G09G 2340/0435; G09G 2354/00; A63F 13/525
See application file for complete search history.

(56) References Cited

U.S. PATENT DOCUMENTS 9,905,199 B2 *  2/2018  Liu .................... G09G 5/12
10,847,103 B2 * 11/2020  Okamoto ........... G09G 3/36
(Continued)

FOREIGN PATENT DOCUMENTS

CN    1375808 A    10/2002
CN    102592555 A    7/2012
(Continued)

*Primary Examiner* — David L Lewis
*Assistant Examiner* — Shauna-Kay Hall
(74) *Attorney, Agent, or Firm* — WOMBLE BOND DICKINSON (US) LLP

(57) ABSTRACT

A refresh rate switching method and an electronic device are provided. In the method, the electronic device dynamically switches a corresponding screen refresh rate by determining whether a current display image is a high frame rate scenario or a standard frame rate scenario. In the high frame rate scenario, a relatively high screen refresh rate is used to support a high display frame rate. In this way, a user can obtain experience of the high display frame rate, and the display image is smooth without motion blur. In the standard frame rate scenario, a default low screen refresh rate is used to reduce power consumption of an entire system.

16 Claims, 13 Drawing Sheets

(56) References Cited

U.S. PATENT DOCUMENTS

| | | |
|---|---|---|
| 2002/0126083 A1 | 9/2002 | Cairns et al. |
| 2013/0141642 A1* | 6/2013 | Wu ................. G09G 5/363 348/E7.001 |
| 2015/0261284 A1 | 9/2015 | Lee et al. |
| 2015/0262525 A1 | 9/2015 | Cha et al. |
| 2016/0078838 A1* | 3/2016 | Huang ................. G09G 5/00 345/520 |
| 2017/0040001 A1* | 2/2017 | Zhang ................. G09G 5/18 |
| 2017/0365207 A1 | 12/2017 | Maaranen et al. |
| 2018/0261191 A1* | 9/2018 | Yi ................. G09G 5/393 |
| 2019/0156785 A1* | 5/2019 | Marchya ............ G09G 3/2096 |
| 2021/0201731 A1* | 7/2021 | Ranjan ................. G09G 3/20 |

FOREIGN PATENT DOCUMENTS

| | | |
|---|---|---|
| CN | 103473051 A | 12/2013 |
| CN | 104282286 A | 1/2015 |
| CN | 104731543 A | 6/2015 |
| CN | 105427782 A | 3/2016 |
| CN | 105427785 A | 3/2016 |
| CN | 106250085 A | 12/2016 |
| CN | 106875925 A | 6/2017 |
| CN | 107924667 A | 4/2018 |
| CN | 107995678 A | 5/2018 |
| CN | 108243349 A | 7/2018 |
| CN | 109104638 A | 12/2018 |
| CN | 110022953 A | 7/2019 |
| CN | 110377251 A | 10/2019 |
| CN | 110619860 A | 12/2019 |
| JP | 2004151222 A | 5/2004 |
| JP | 2018094023 A | 6/2018 |
| JP | 2019095815 A | 6/2019 |
| KR | 20180015038 A | 2/2018 |

* cited by examiner

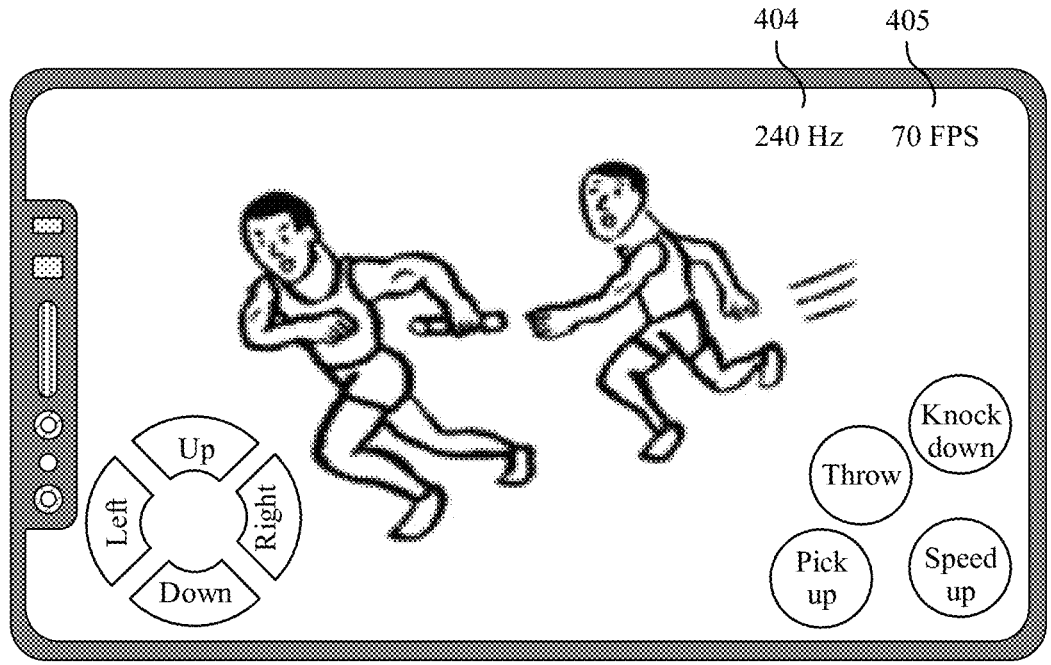
FIG. 4(b)
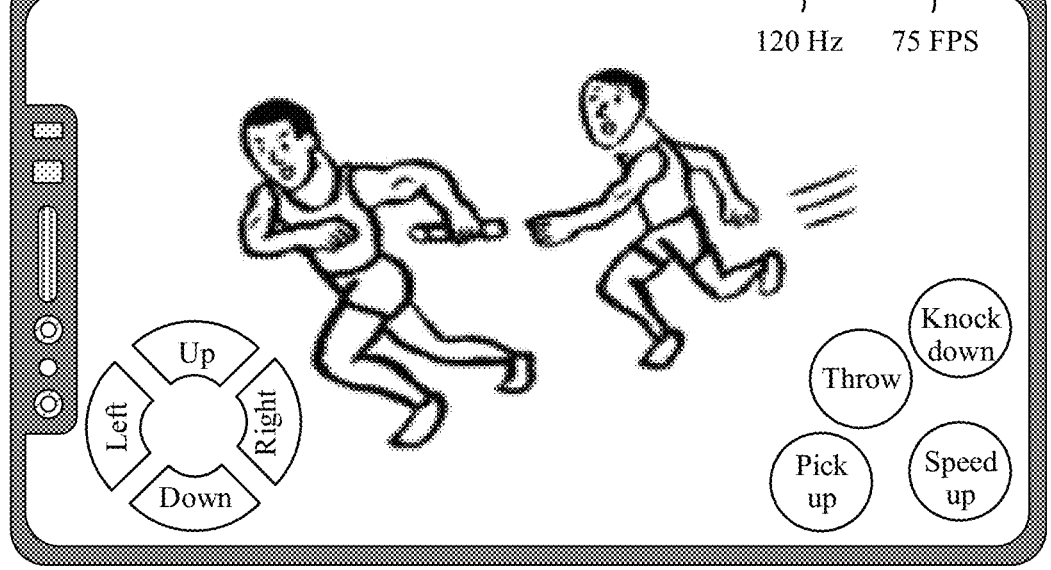
FIG. 4(c)
~
TO
FIG. 4(d)

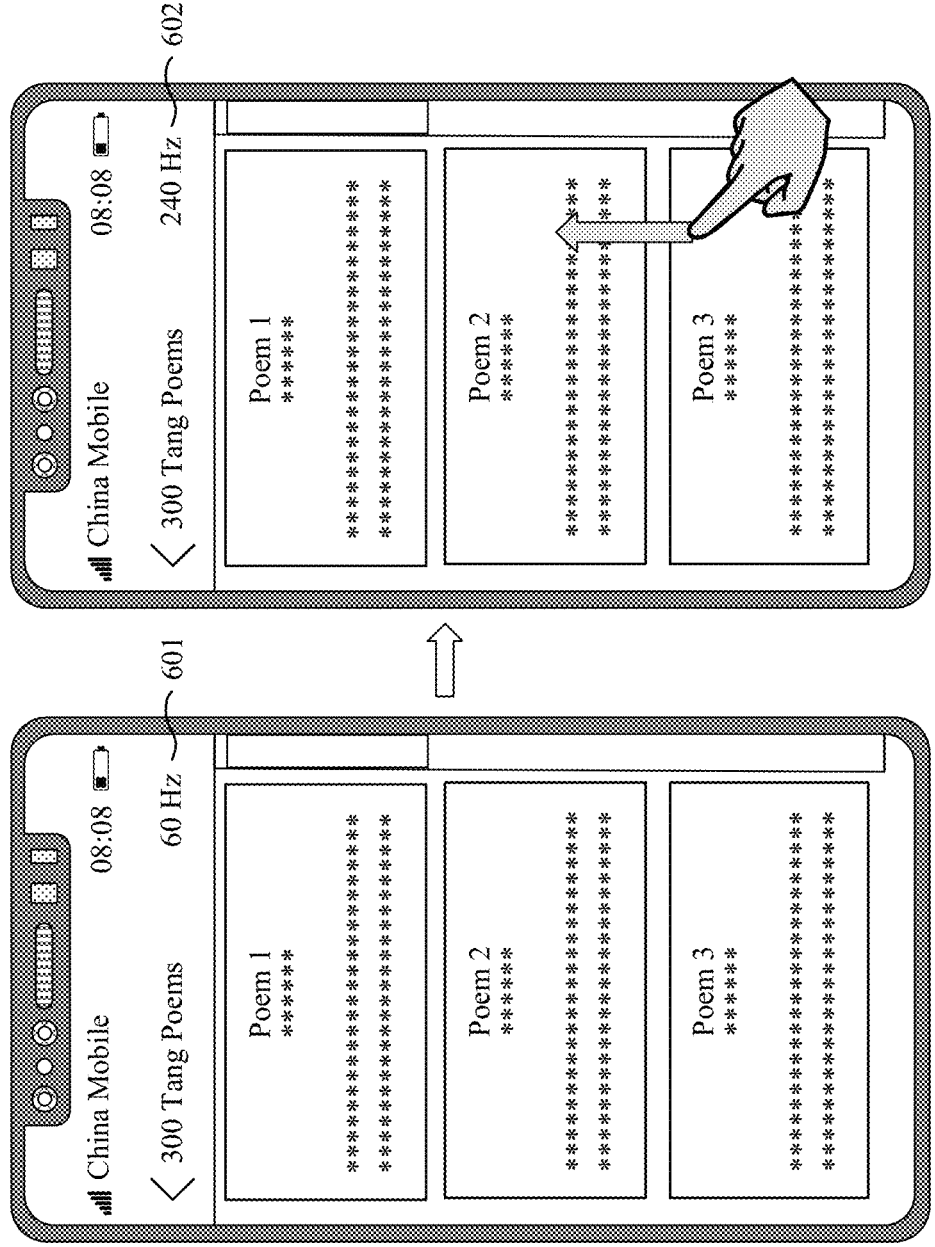

REFRESH RATE SWITCHING METHOD AND ELECTRONIC DEVICE

CROSS-REFERENCE TO RELATED APPLICATION

This is a National Stage of International Patent Application No. PCT/CN2021/078682 filed on Mar. 2, 2021, which claims priority to Chinese Patent Application No. 202010153662.8 filed on Mar. 6, 2020. Both of the aforementioned applications are hereby incorporated by reference in their entireties.

TECHNICAL FIELD

This application relates to the field of terminal and display technologies, and in particular, to a refresh rate switching method and an electronic device.

BACKGROUND

With the improvement of display technologies, more and more manufacturers launch electronic devices that can support higher screen refresh rates. A higher screen refresh rate may support a higher display frame rate, and the higher display frame rate enables smoother display of a dynamic image. For example, if a display frame rate increases from 60 frames per second (FPS) to 90 FPS, a dynamic blur of human eyes can be significantly reduced, thereby bringing smoother experience.

More and more manufacturers fix a screen refresh rate at a highest screen refresh rate that can be supported by an electronic device, so that the electronic device can maintain a highest display frame rate of an application, thereby improving smoothness of an image.

However, an increase in a display frame rate causes rendering and drawing power consumption of a graphics rendering system to increase exponentially and maintaining a relatively high screen refresh rate also causes an increase in additional power consumption. Consequently, power consumption of an entire system is increased.

SUMMARY

This application provides a refresh rate switching method and an electronic device, to dynamically switch a screen refresh rate based on a scenario to which a display image belongs, so that experience of a high display frame rate can be obtained, and power consumption can be reduced.

According to a first aspect, this application provides a refresh rate switching method. The method includes: An electronic device refreshes a display by using a first refresh rate. The first refresh rate is not a highest screen refresh rate of a plurality of optional screen refresh rates of the electronic device. When the electronic device determines that a display image is a game scenario, the electronic device determines one screen refresh rate from the plurality of optional screen refresh rates as a second refresh rate according to the following operations, and refreshes the display by using the second refresh rate: The electronic device sets the second refresh rate to the highest screen refresh rate. When determining that the second refresh rate is not the first refresh rate, the electronic device determines whether a current display frame rate matches the second refresh rate. The current display frame rate is a display frame rate of a display image that is detected after the display is refreshed by using the second refresh rate. When determining that the current display frame rate does not match the second refresh rate, the electronic device updates the second refresh rate to a next screen refresh rate of the plurality of optional screen refresh rates in descending order of screen refresh rates. When determining that the current display frame rate matches the second refresh rate or determining that the second refresh rate is the first refresh rate, the electronic device maintains a screen refresh rate as the second refresh rate.

It may be understood that, after setting the second refresh rate as a refresh rate or updating the second refresh rate, the electronic device refreshes the display by using the second refresh rate, and the current display frame rate is the display frame rate of the display image that is detected after the second refresh rate is set or updated.

According to the method provided in the first aspect, when a commonly used interface or application is used, the electronic device refreshes the display by using the first refresh rate that is not the highest screen refresh rate. Because the used screen refresh rate is lower than the highest screen refresh rate, compared with always refreshing the display by using the highest screen refresh rate, refreshing the display by using the first refresh rate reduces power consumption. After detecting the game scenario, the electronic device first sets a current screen refresh rate to the highest screen refresh rate and detects whether the current display frame rate matches the current screen refresh rate. If the current display frame rate matches the current screen refresh rate, the current screen refresh rate is maintained. If the current display frame rate does not match the current screen refresh rate, the current screen refresh rate is updated to a next screen refresh rate in descending order of screen refresh rates, and detection is performed again, until it is detected that the current display frame rate matches the second refresh rate or the screen refresh rate is reduced to the first refresh rate commonly used by the user. Finally, there are three possibilities. Possibility 1: If a finally determined matched screen refresh rate is the highest screen refresh rate, best experience of a high display frame rate can be provided. Possibility 2: If a finally determined matched screen refresh rate is neither the highest screen refresh rate nor the first refresh rate, it indicates that an output frame rate of the game scenario still cannot reach a degree of matching the highest screen refresh rate. A best display frame rate supported in the game scenario can be reached by using the finally determined second refresh rate, so that best experience of a high display frame rate can be provided. In addition, because the used second refresh rate is lower than the highest screen refresh rate, compared with always refreshing the display by using the highest screen refresh rate, refreshing the display by using the second refresh rate also reduces power consumption. Possibility 3: If a finally determined screen refresh rate is the first refresh rate, it indicates that the output frame rate of the game scenario can reach a maximum degree of matching the first refresh rate. A highest display frame rate that can be supported in the game scenario can be reached by using the first refresh rate, so that good experience of a display frame rate can be provided. In addition, because the used first refresh rate is lower than the highest screen refresh rate, compared with always refreshing the display by using the highest screen refresh rate, refreshing the display by using the first refresh rate also reduces power consumption.

In one embodiment, there are a plurality of manners in which the electronic device determines whether the current display frame rate matches the second refresh rate.

With reference to the first aspect, in some embodiments, each of the plurality of optional screen refresh rates corresponds to a frame rate range. That the electronic device determines whether a current display frame rate matches the second refresh rate includes: The electronic device determines whether the current display frame rate belongs to a frame rate range corresponding to the second refresh rate. When determining that the current display frame rate belongs to the frame rate range corresponding to the second refresh rate, the electronic device determines that the current display frame rate matches the second refresh rate. When determining that the current display frame rate does not belong to the frame rate range corresponding to the second refresh rate, the electronic device determines that the current display frame rate does not match the second refresh rate.

In one embodiment, one frame rate range includes all frame rates from a minimum frame rate value to a maximum frame rate value in the frame rate range. If a value of a display frame rate is greater than or equal to the minimum frame rate value and less than or equal to the maximum frame rate value, it may be determined that the display frame rate belongs to the frame rate range. If a value of a display frame rate is less than the minimum frame rate value or greater than the maximum frame rate value, it may be determined that the display frame rate does not belong to the frame rate range.

For example, if a frame rate range corresponding to a screen refresh rate of 90 Hz is from 80 FPS to 90 FPS, and the current display frame rate is 80 FPS, it may be determined that the current display frame rate belongs to the frame rate range. If the current display frame rate is 85 FPS, it may alternatively be determined that the current display frame rate belongs to the frame rate range. If the current display frame rate is 90 FPS, it may alternatively be determined that the current display frame rate belongs to the frame rate range. However, if the current display frame rate is 75 FPS, it may be determined that the current display frame rate does not belong to the frame rate range. It may be understood that, because the current display frame rate can reach only a maximum of a currently used screen refresh rate, there is no case in which the current display frame rate does not belong to the frame rate range because the current display frame rate exceeds 90 FPS.

In this embodiment of this application, each screen refresh rate corresponds to one frame rate range, and the electronic device only needs to determine whether the current display frame rate belongs to the frame rate range, to determine whether the current display frame rate matches the second refresh rate. No extra operations are required, and the operation is easy.

With reference to the first aspect, in some embodiments, that the electronic device determines whether a current display frame rate matches the second refresh rate includes: The electronic device determines whether a difference between a value of the second refresh rate and a value of the current display frame rate is less than a preset difference. When determining that the difference is less than the preset difference, the electronic device determines that the current display frame rate matches the second refresh rate. When determining that the difference is not less than the preset difference, the electronic device determines that the current display frame rate does not match the second refresh rate.

In this embodiment of this application, whether the current display frame rate matches the second refresh rate is determined by determining whether the difference between the value of the second refresh rate and the value of the current display frame rate is less than the preset difference. Real-time computing does not need to pre-store too much data, thereby saving occupied storage space.

With reference to the first aspect, in some embodiments, the method further includes: The electronic device determines whether a type of an application currently running on a foreground is a game type. The electronic device determines whether an increase in an output frame rate of the application exceeds a preset threshold. When determining that the type of the application currently running on the foreground is the game type and the increase in the output frame rate of the application exceeds the preset threshold, the electronic device determines that the display image is the game scenario.

In this embodiment of this application, when determining that the type of the application is the game type, the electronic device does not directly determine that the display image is the game scenario. Instead, on a basis of determining that the application is of the game type, and after the increase in the output frame rate of the application exceeds the preset threshold, the electronic device determines that the display image is the game scenario. In this way, a high frame rate scenario is identified more accurately, and an effect of reducing power consumption is better.

In one embodiment, based on different actual situations, the plurality of optional screen refresh rates may include different quantities of screen resolutions.

With reference to the first aspect, in some embodiments, the plurality of optional screen refresh rates includes two screen refresh rates: a lowest screen refresh rate and the highest screen refresh rate. The first refresh rate is the lowest screen refresh rate.

With reference to the first aspect, in some embodiments, the plurality of optional screen refresh rates includes more than two screen refresh rates. The first refresh rate is a lowest screen refresh rate of the plurality of optional screen refresh rates; or the first refresh rate is a screen refresh rate other than the highest screen refresh rate and the lowest screen refresh rate of the plurality of optional screen refresh rates.

According to a second aspect, this application provides a refresh rate switching method. The method includes: An electronic device refreshes a display by using a third refresh rate. The third refresh rate is not a highest screen refresh rate of a plurality of optional screen refresh rates of the electronic device. When detecting a touch operation entered by a user, the electronic device refreshes the display by using the highest screen refresh rate. After detecting that the touch operation leaves, when detecting that an image stagnates in refreshing or no touch operation is detected within preset duration, the electronic device refreshes the display by using the third refresh rate.

In this embodiment of this application, when the image stagnates in refreshing or no touch operation is detected, the electronic device refreshes the display by using the third refresh rate that is not the highest screen refresh rate. Because the used screen refresh rate is lower than the highest screen refresh rate, compared with always refreshing the display by using the highest screen refresh rate, this reduces power consumption. When detecting the touch operation, the electronic device adjusts the screen refresh rate to the highest screen refresh rate, to provide a user with good experience of a high frame rate in such a high frame rate scenario. Until the touch operation leaves and it is detected that the image stagnates in refreshing, or after the touch operation leaves and no touch operation is detected within the preset duration, the screen refresh rate is adjusted to the third refresh rate. In such a standard frame rate scenario, a commonly used third refresh rate set by the factory or the user continues to be used to reduce power consumption. In this way, experience of a high display frame rate is provided for the user in the high frame rate scenario, and power consumption is not wasted in the standard frame rate scenario, thereby reducing power consumption of an entire system.

With reference to the second aspect, in some embodiments, the method further includes: When the electronic device determines that a foreground application does not send, within stagnation detection duration, layer data that needs to be displayed, the electronic device determines that image refreshing stagnation is detected.

In this embodiment of this application, whether it is detected that the image stops refreshing is determined based on whether the layer data that needs to be displayed and that is sent by the application is received. Detection is performed based on an image data source to make a detection result more accurate.

In one embodiment, based on different actual situations, the plurality of optional screen refresh rates may include different quantities of screen resolutions.

With reference to the second aspect, in some embodiments, the plurality of optional screen refresh rates includes two screen refresh rates: a lowest screen refresh rate and the highest screen refresh rate. The third refresh rate is the lowest screen refresh rate.

With reference to the second aspect, in some embodiments, the plurality of optional screen refresh rates includes more than two screen refresh rates. The third refresh rate is a lowest screen refresh rate of the plurality of optional screen refresh rates; or the third refresh rate is a screen refresh rate other than the highest screen refresh rate and the lowest screen refresh rate of the plurality of optional screen refresh rates.

According to a third aspect, this application provides an electronic device. The electronic device includes a display, one or more processors, a memory, a plurality of applications, and one or more computer programs. The one or more computer programs are stored in the memory, the one or more computer programs include instructions, and when the instructions are executed by the electronic device, the electronic device is enabled to perform the following operations: refreshing the display by using a first refresh rate, where the first refresh rate is not a highest screen refresh rate of a plurality of optional screen refresh rates of the electronic device; and when determining that a display image is a game scenario, determining one screen refresh rate from the plurality of optional screen refresh rates as a second refresh rate according to the following operations, and refreshing the display by using the second refresh rate: setting the second refresh rate to the highest screen refresh rate; when determining that the second refresh rate is not the first refresh rate, determining whether a current display frame rate matches the second refresh rate, where the current display frame rate is a display frame rate of a display image that is detected after the display is refreshed by using the second refresh rate; and when determining that the current display frame rate does not match the second refresh rate, updating the second refresh rate to a next screen refresh rate of the plurality of optional screen refresh rates in descending order of screen refresh rates; or when determining that the current display frame rate matches the second refresh rate or determining that the second refresh rate is the first refresh rate, maintaining a screen refresh rate as the second refresh rate.

In one embodiment, there are a plurality of manners in which the electronic device determines whether the current display frame rate matches the second refresh rate.

With reference to the third aspect, in some embodiments, each of the plurality optional screen refresh rates corresponds to a frame rate range, and when the instructions are executed by the electronic device, the electronic device is enabled to perform the following operations: determining whether the current display frame rate belongs to a frame rate range corresponding to the second refresh rate; and when determining that the current display frame rate belongs to the frame rate range corresponding to the second refresh rate, determining that the current display frame rate matches the second refresh rate; or when determining that the current display frame rate does not belong to the frame rate range corresponding to the second refresh rate, determining that the current display frame rate does not match the second refresh rate.

With reference to the third aspect, in some embodiments, when the instructions are executed by the electronic device, the electronic device is enabled to perform the following operations: determining whether a difference between a value of the second refresh rate and a value of the current display frame rate is less than a preset difference; and when determining that the difference is less than the preset difference, determining that the current display frame rate matches the second refresh rate; or when determining that the difference is not less than the preset difference, determining that the current display frame rate does not match the second refresh rate.

With reference to the third aspect, in some embodiments, when the instructions are executed by the electronic device, the electronic device is enabled to further perform the following operations: determining whether a type of an application currently running on a foreground is a game type; determining whether an increase in an output frame rate of the application exceeds a preset threshold; and when determining that the type of the application currently running on the foreground is the game type and the increase in the output frame rate of the application exceeds the preset threshold, determining that the display image is the game scenario.

In one embodiment, based on different actual situations, the plurality of optional screen refresh rates may include different quantities of screen resolutions.

With reference to the third aspect, in some embodiments, the plurality of optional screen refresh rates includes two screen refresh rates: a lowest screen refresh rate and the highest screen refresh rate. The first refresh rate is the lowest screen refresh rate.

With reference to the third aspect, in some embodiments, the plurality of optional screen refresh rates includes more than two screen refresh rates. The first refresh rate is a lowest screen refresh rate of the plurality of optional screen refresh rates; or the first refresh rate is a screen refresh rate other than the highest screen refresh rate and the lowest screen refresh rate of the plurality of optional screen refresh rates.

According to a fourth aspect, this application provides an electronic device. The electronic device includes a display, one or more processors, a memory, a plurality of applications, and one or more computer programs. The one or more computer programs are stored in the memory, the one or more computer programs include instructions, and when the instructions are executed by the electronic device, the electronic device is enabled to perform the following operations: refreshing the display by using a third refresh rate, where the third refresh rate is not a highest screen refresh rate of a plurality of optional screen refresh rates of the electronic device; when detecting a touch operation entered by a user, refreshing the display by using the highest screen refresh rate; and after detecting that the touch operation leaves, when detecting that an image stagnates in refreshing or no touch operation is detected within preset duration, refreshing the display by using the third refresh rate.

With reference to the fourth aspect, in some embodiments, when the instructions are executed by the electronic device, the electronic device is enabled to further perform the following operation: when determining that a foreground application does not send, within stagnation detection duration, layer data that needs to be displayed, determining that image refreshing stagnation is detected.

With reference to the fourth aspect, in some embodiments, the plurality of optional screen refresh rates includes two screen refresh rates: a lowest screen refresh rate and the highest screen refresh rate. The third refresh rate is the lowest screen refresh rate.

With reference to the fourth aspect, in some embodiments, the plurality of optional screen refresh rates includes more than two screen refresh rates. The third refresh rate is a lowest screen refresh rate of the plurality of optional screen refresh rates; or the third refresh rate is a screen refresh rate other than the highest screen refresh rate and the lowest screen refresh rate of the plurality of optional screen refresh rates.

According to a fifth aspect, an embodiment of this application provides a chip. The chip is applied to an electronic device, the chip includes one or more processors, and the processor is configured to invoke computer instructions to enable the electronic device to perform the method described in any one of the first aspect or the possible embodiments of the first aspect.

According to a sixth aspect, an embodiment of this application provides a chip. The chip is applied to an electronic device, the chip includes one or more processors, and the processor is configured to invoke computer instructions to enable the electronic device to perform the method described in any one of the second aspect or the possible embodiments of the second aspect.

According to a seventh aspect, an embodiment of this application provides a computer program product including instructions. When the computer program product runs on an electronic device, the electronic device is enabled to perform the method described in any one of the first aspect and the possible embodiments of the first aspect.

According to an eighth aspect, an embodiment of this application provides a computer program product including instructions. When the computer program product runs on an electronic device, the electronic device is enabled to perform the method described in any one of the second aspect and the possible embodiments of the second aspect.

According to a ninth aspect, an embodiment of this application provides a computer-readable storage medium, including instructions. When the instructions are run on an electronic device, the electronic device is enabled to perform the method described in any one of the first aspect and the possible embodiments of the first aspect.

According to a tenth aspect, an embodiment of this application provides a computer-readable storage medium, including instructions. When the instructions are run on an electronic device, the electronic device is enabled to perform the method described in any one of the second aspect or the possible embodiments of the second aspect.

It may be understood that the electronic device according to the third aspect, the chip according to the fifth aspect, the computer program product according to the seventh aspect, and the computer storage medium according to the ninth aspect are all configured to perform the method provided in the first aspect of embodiments of this application. The electronic device according to the fourth aspect, the chip according to the sixth aspect, the computer program product according to the eighth aspect, and the computer storage medium according to the tenth aspect are all configured to perform the method provided in the second aspect of embodiments of this application. Therefore, for beneficial effects that can be achieved, refer to beneficial effects in a corresponding method. Details are not described herein again.

BRIEF DESCRIPTION OF DRAWINGS

FIG. 4(a) to FIG. 4(d) are a schematic diagram of another group of interfaces of a refresh rate switching method according to an embodiment of this application;

FIG. 6(a) to FIG. 6(d) are a schematic diagram of another group of interfaces of a refresh rate switching method according to an embodiment of this application;

DESCRIPTION OF EMBODIMENTS

Figure 1:
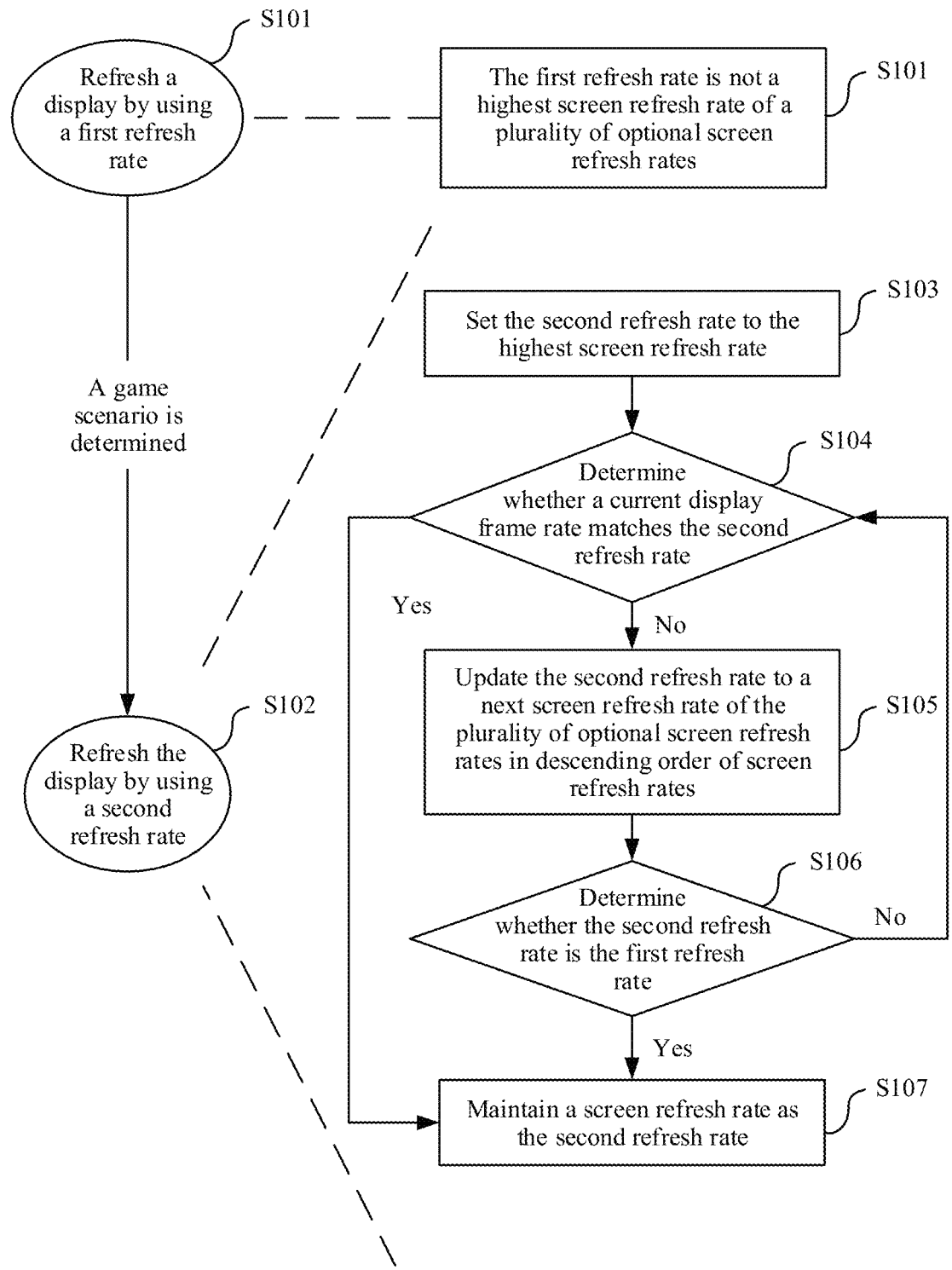
FIG. 1 is a schematic diagram of a change of a refresh rate status according to an embodiment of this application.

Terms used in the following embodiments of this application are merely intended to describe particular embodiments but are not intended to limit this application. Terms "one", "a", "the", "the foregoing", "this", and "the one" of singular forms used in this specification and the appended claims of this application are also intended to include plural forms, unless otherwise specified in the context clearly. It should be further understood that a term "and/or" used in this application indicates and includes any one or all of possible combinations of one or more listed items.

The following terms "first" and "second" are merely intended for a purpose of description and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

Because embodiments of this application relate to application of display technologies, for ease of understanding, the following first describes related terms and concepts in embodiments of this application.

(1) Screen Refresh Rate

The screen refresh rate means a quantity of times for which an image of a screen is refreshed per second. The unit is Hz.

A higher screen refresh rate can support a higher display frame rate. For example, if a refresh rate of a display is 120 Hz, the display can support a display frame rate of 60 FPS and a display frame rate of 90 FPS, and can support a maximum display frame rate of 120 FPS.

However, if the screen refresh rate is insufficient, even if an output frame rate is relatively high, a final display frame rate can only reach a value of the screen refresh rate. For example, if a refresh rate of a display is 60 Hz, even if an output frame rate of an application is 100 FPS, a final display frame rate can only reach 60 FPS.

(2) Output Frame Rate

The output frame rate means a frame rate that is output to a display by an interface or an application through a video card. The unit is FPS, indicating a quantity of frames displayed per second. A frame is a minimum unit of a single video image in a video animation. One frame is a static image. Continuous frames form the animation.

In an electronic device, output frame rates of most interfaces or applications correspondingly change with a change of a screen refresh rate in a system. For example, when the screen refresh rate is set to 60 Hz, the output frame rates of the interfaces or applications are adjusted to 60 FPS. When the screen refresh rate is set to 90 Hz, the output frame rates of the interfaces or applications are adjusted to 90 FPS.

However, output frame rates of some applications are relatively independent, for example, a game application. These applications have respective independent timers and output frame rates, and are not controlled by the screen refresh rate set in the system. For example, an output frame rate of one of the some applications is set to 120 FPS. If a screen resolution is set to 60 Hz, the output frame rate of the application is not adjusted to 60 FPS as the screen resolution in the system changes. Instead, the application maintains the output frame rate of 120 FPS. If the screen resolution is set to 144 Hz, the application still maintains the output frame rate of 120 FPS.

(3) Display Frame Rate

The display frame rate is an actual frame rate of an interface or an application displayed on the display. The unit is also FPS.

When the output frame rate is less than the screen refresh rate, the display frame rate is approximately equal to the output frame rate. For example, the output frame rate is 30 FPS, and the screen refresh rate is 60 Hz. To ensure continuity of image display, duplicate frames are filled in 60 images displayed on the display in one second. Such duplicate frames are not counted when the display frame rate is counted. Therefore, effective images actually displayed are still 30 frames, that is, the display frame rate is 30 FPS.

When the output frame rate is equal to the screen refresh rate, the display frame rate is approximately equal to the output frame rate. For example, the output frame rate is 90 FPS, and the screen refresh rate is 90 Hz. In this case, the application outputs 90 images per second, the display refreshes and displays 90 images per second, and the display frame rate is 90 FPS.

When the output frame rate is greater than the screen refresh rate, the display frame rate is approximately equal to the screen refresh rate. For example, the output frame rate is 120 FPS, and the screen refresh rate is 90 Hz. In this case, the application outputs 120 images per second, but the display can only refresh 90 images per second. Therefore, the 120 images output by the application per second cannot be completely displayed, and a maximum of 90 images can be displayed. In this case, the electronic device discards or combines some of the 120 images output by the application per second, and finally displays 90 images per second, that is, the display frame rate is 90 FPS.

In addition, a reason why the display frame rate is approximately equal to the output frame rate or the screen refresh rate rather than equal to the output frame rate or the screen refresh rate is that, during actual application, sometimes a timing of image displaying may not be completely consistent with that of screen refreshing. Therefore, not every output frame image can be displayed just when a screen is refreshed, and the frame image may be lost. Consequently, the display frame rate fluctuates slightly. For example, even if the output frame rate is 90 FPS and the screen refresh rate is 90 Hz, a final actual display frame rate may continuously fluctuate between 80 FPS and 90 FPS.

(4) High Frame Rate Scenario

In embodiments of this application, the high frame rate scenario is a scenario in which an image display effect and user experience are improved with an increase in the display frame rate. For example, for some images with relatively high moving speed, if a frame rate is insufficient, motion blur, delaying, or the like may occur, thereby affecting visual experience of a user. When the display frame rate is higher, the image display effect is smoother and more realistic.

(5) Standard Frame Rate Scenario

In embodiments of this application, the standard frame rate scenario is a scenario in which the increase in the display frame rate does not significantly affect an image display effect and user experience. For example, in a static image scenario or some images with relatively low moving speed, a high or low display frame rate does not affect a final presentation effect of the display image.

(6) A Plurality of Optional Screen Refresh Rates

In embodiments of this application, the electronic device may support a plurality of optional screen refresh rates, and the plurality of optional screen refresh rates may include at least a lowest screen refresh rate and a highest screen refresh rate.

The plurality of optional screen refresh rates may include only two optional screen refresh rates. One is the highest screen refresh rate, and the other is the lowest screen refresh rate.

For example, the two optional screen refresh rates are respectively 60 Hz and 90 Hz. 60 Hz is the lowest screen refresh rate of the plurality of optional screen refresh rates, and 90 Hz is the highest screen refresh rate of the plurality of optional screen refresh rates.

In some embodiments of this application, the plurality of optional screen refresh rates may further include more optional screen refresh rates.

For example, three optional screen refresh rates are included: 60 Hz, 90 Hz, and 120 Hz. 60 Hz is the lowest screen refresh rate of the plurality of optional screen refresh rates, and 120 Hz is the highest screen refresh rate of the plurality of optional screen refresh rates.

For example, four optional screen refresh rates are included: 60 Hz, 90 Hz, 120 Hz, and 144 Hz. 60 Hz is the lowest screen refresh rate of the plurality of optional screen refresh rates, and 120 Hz is the highest screen refresh rate of the plurality of optional screen refresh rates.

For example, five optional screen refresh rates are included: 45 Hz, 60 Hz, 90 Hz, 120 Hz, and 240 Hz. 45 Hz is the lowest screen refresh rate of the plurality of optional screen refresh rates, and 240 Hz is the highest screen refresh rate of the plurality of optional screen refresh rates.

It may be understood that, according to an actual requirement, the plurality of optional screen refresh rates may further include more screen refresh rates. The optional screen refresh rates may also have more different choices. This is not limited herein.

(7) Game Scenario Detection

In embodiments of this application, the electronic device may determine, based on information stored in a third-party feature library, whether a type of a foreground application that is currently running is a game type. In addition, the electronic device may further monitor an output frame rate of the foreground application in real time. When an increase in the output frame rate of the foreground application exceeds a preset threshold, the electronic device determines to enter a game scenario.

For example, the user starts an application game 1, and the electronic device determines, by using application type information prestored in the third-party feature library, that a type of the application currently running on a foreground is a game type. In this case, an output frame rate of the game application is 45 FPS, and the electronic device has not determined to enter the game scenario. When the user logs in to the application game 1 and enters a game operation interface, an output frame rate of the application game 1 is increased to 60 FPS. The electronic device detects that an increase in the output frame rate exceeds a preset threshold of 10 FPS, and determines that the current interface is the game scenario.

(8) Touch Detection

For example, when a sensor module of the electronic device detects a touch operation entered by the user, for example, when a finger or a stylus is used to contact with a screen, a down event is generated. The electronic device may determine, based on the down event, that the touch operation is detected.

When the sensor module detects that a touch point of the user moves, for example, the finger or the stylus is used to slide on the screen, and the finger or the stylus does not leave the screen, a move event is generated. The electronic device may determine, based on the move event, that the movement of the touch point of the user is detected.

When the sensor module detects that the touch operation leaves (which is also referred to as off-screen), an up event is generated. The electronic device may determine, based on the up event, that the touch operation leaves.

It may be understood that, during actual application, there may further be a plurality of other touch detection manners. This is not limited in embodiments of this application.

(9) Image Stagnation Refresh Detection

The application sends layer data that needs to be displayed to a layer fusion system in the electronic device for fusion. The layer fusion system may send, to a graphics service in the electronic device, time information of sending, by the application, the layer data that needs to be displayed. If the graphics service does not receive, within a period of time (which may be referred to as stagnation detection duration, for example, one second), time information sent by the layer fusion system, it indicates that the application does not have a graphic on which a frame image needs to be drawn. Therefore, the graphics service may determine that a current image stagnates in refreshing.

In the conventional technology, an electronic device maintains a high screen refresh rate, so that when a value of a highest output frame rate of an interface or an application is less than or equal to a value of the screen refresh rate, a display frame rate of a display may reach a highest display frame rate of the interface or the application. For example, if the screen refresh rate is fixed at 90 Hz and the highest output frame rate of the interface or the application is 30 FPS, the display frame rate can reach 30 FPS. For another example, if the screen refresh rate is fixed at 90 Hz and the highest output frame rate of the interface or the application is 90 FPS, the display frame rate can reach 90 FPS. However, such a fixed screen refresh rate requires the electronic device to continuously maintain relatively large power consumption.

In embodiments of this application, a scenario to which a display image belongs is determined, for example, whether the scenario is a high frame rate scenario or a standard frame rate scenario is determined. A higher screen refresh rate is used to support a higher display frame rate only when increasing the display frame rate affects the image display effect, so as to provide smooth experience. A lower screen refresh rate is used when increasing the display frame rate does not affect the image display effect, so as to reduce power consumption. When a high display frame rate is required, the screen refresh rate is increased, thereby providing experience of the high display frame rate. When only a lower display frame rate is required, a lower screen refresh rate is used, thereby reducing power consumption of an entire system of the electronic device.

The following describes a refresh rate switching method according to an embodiment of this application.

In this embodiment of this application, an electronic device has a plurality of switchable screen refresh rates. The electronic device uses a first refresh rate when determining that a display image is a high frame rate scenario and uses a second refresh rate when determining that the display image is a standard frame rate scenario. The second refresh rate is lower than the first refresh rate.

The high frame rate scenario may include at least a game scenario or a touch scenario.

(1) The Game Scenario

FIG. 1 is a schematic diagram of a change of a refresh rate status according to an embodiment of this application.

S101: The electronic device refreshes a display by using the first refresh rate, where the first refresh rate is not a highest screen refresh rate of a plurality of optional screen refresh rates of the electronic device.

The electronic device has the plurality of optional screen refresh rates, and the electronic device currently refreshes the display by using the first refresh rate that is not the highest screen refresh rate.

In some embodiments, the first refresh rate may be a lowest screen refresh rate of the plurality of optional screen refresh rates. For example, the plurality of optional screen refresh rates are 60 Hz and 90 Hz, and the first refresh rate may be 60 Hz. For another example, the plurality of optional screen refresh rates are 60 Hz, 90 Hz, and 120 Hz, and the first refresh rate may be 60 Hz.

In some embodiments, the first refresh rate may alternatively not be the lowest screen refresh rate of the plurality of optional screen refresh rates. For example, the plurality of optional screen refresh rates are 60 Hz, 90 Hz, and 120 Hz, and the first refresh rate may be 90 Hz. For another example, the plurality of optional screen refresh rates are 60 Hz, 90 Hz, 120 Hz, and 240 Hz, and the first refresh rate may be 90 Hz or 120 Hz.

It may be understood that the first refresh rate may be a factory default screen refresh rate of the electronic device or may be a daily used screen refresh rate selected by a user from the plurality of optional screen refresh rates. This is not limited herein.

S102: When the electronic device determines that the display image is the game scenario, the electronic device determines one screen refresh rate from the plurality of optional screen refresh rates as the second refresh rate according to operations S103 to S107, and refreshes the display by using the second refresh rate.

The game scenario is a high frame rate scenario in which a higher display frame rate indicates a better display effect. Therefore, after the user opens a game application, when the electronic device determines that a display image is a game scenario, the electronic device starts to attempt to use a relatively high screen refresh rate, to support a relatively high output frame rate, thereby achieving a relatively high display frame rate.

Because the output frame rate of the game application is independent of a screen refresh rate of a system, the output frame rate of the game application does not correspondingly change with a change of the screen refresh rate of the system. Therefore, the electronic device determines one refresh rate from the plurality of optional screen refresh rates as the second refresh rate, and after refreshing the display by using the second refresh rate, determines whether a current display frame rate matches the second refresh rate. An optimal screen refresh rate matching the output frame rate of the game application is determined in a hierarchical attempt detection manner. This manner has wider adaptability and is not limited by a game application. A process of determining the second refresh rate includes operations S103 to 107.

S103: The electronic device sets the second refresh rate to the highest screen refresh rate.

The electronic device first sets the second refresh rate to the highest screen refresh rate, and refreshes the display by using the highest screen refresh rate.

S104: When determining that the second refresh rate is not the first refresh rate, the electronic device determines whether the current display frame rate matches the second refresh rate.

The current display frame rate is a display frame rate of a display image that is detected by the electronic device after the display is refreshed by using the second refresh rate.

When S103 is performed to determine the second refresh rate as the highest screen refresh rate, or S106 is performed to determine to update the second refresh rate to a next screen refresh rate of the plurality of optional screen refresh rates and determine that the second refresh rate is not the first refresh rate, it indicates that the electronic device increases the screen refresh rate to the second refresh rate. The second refresh rate may be the highest screen refresh rate of the plurality of optional screen refresh rates, or may be any refresh rate of the plurality of optional screen refresh rates that is higher than the first refresh rate.

After refreshing the display by using the second refresh rate, the electronic device first detects the display frame rate of the display image to obtain the current display frame rate, and then determines whether the current display frame rate matches the second refresh rate. If the current display frame rate does not match the second refresh rate, S105 is performed. If the current display frame rate matches the second refresh rate, S107 is performed.

There are a plurality of manners for determining whether the current display frame rate matches the second refresh rate.

For example, each of the plurality of optional screen refresh rates corresponds to a matching frame rate range, to determine whether the current display frame rate belongs to a frame rate range corresponding to the second refresh rate. If the current display frame rate belongs to the frame rate range corresponding to the second refresh rate, the electronic device determines that the current display frame rate matches the second refresh rate. If the current display frame rate does not belong to the frame rate range corresponding to the second refresh rate, the electronic device determines that the current display frame rate does not match the second refresh rate. It may be understood that one frame rate range includes all frame rates from a minimum frame rate value to a maximum frame rate value in the frame rate range. To determine whether a display frame rate belongs to a frame rate range, it may be checked whether a value of the display frame rate is greater than or equal to a minimum frame rate value in the frame rate range and less than or equal to a maximum frame rate value in the frame rate range. If the value of the display frame rate is greater than or equal to the minimum frame rate value in the frame rate range and less than or equal to the maximum frame rate value in the frame rate range, it may be determined that the display frame rate belongs to the frame rate range. If the value of the display frame rate is less than the minimum frame rate value in the frame rate range or greater than the maximum frame rate value in the frame rate range, it may be determined that the display frame rate does not belong to the frame rate range.

For example, the plurality of optional screen refresh rates are 60 Hz, 120 Hz, and 240 Hz. 60 Hz corresponds to a frame rate range from 40 FPS to 60 FPS, 120 Hz corresponds to a frame rate range from 100 FPS to 120 FPS, and 240 Hz corresponds to a frame rate range from 200 FPS to 240 FPS. If the current second refresh rate is 240 Hz, and the current display frame rate is 210 FPS after the screen is refreshed by using the second refresh rate of 240 Hz, because 210 FPS belongs to the frame rate range from 200 FPS to 240 FPS corresponding to the second refresh rate of 240 Hz, it is considered that the display frame rate of 210 FPS matches the second refresh rate of 240 Hz. If the current second refresh rate is 240 Hz, and a detected current display frame rate is 110 FPS, because 110 FPS does not belong to the frame rate range from 200 FPS to 240 FPS corresponding to the second refresh rate of 240 Hz, it is considered that the display frame rate of 110 FPS does not match the second refresh rate of 240 Hz.

For example, it may be determined whether a difference between a value of the second refresh rate and a value of the current display frame rate is less than a preset difference. If the difference is less than the preset difference, the electronic device determines that the current display frame rate matches the second refresh rate. If the difference is not less than the preset difference, the electronic device determines that the current display frame rate does not match the second refresh rate.

For example, the plurality of optional screen refresh rates are 60 Hz, 120 Hz, and 240 Hz, and a predicted difference is 30. If the current second refresh rate is 240 Hz, and the detected current display frame rate is 220 FPS, because a difference of 20 between a value (that is, 240) of the second refresh rate and a value (that is, 220) of the current display frame rate is less than the preset difference of 30, it is considered that the current display frame rate of 220 FPS matches the second refresh rate of 240 Hz. If the current second refresh rate is 240 Hz, and the detected current display frame rate is 110 FPS, because a difference of 130 between a value (that is, 240) of the second refresh rate and a value (that is, 110) of the current display frame rate is not less than the preset difference of 30, it is considered that the current display frame rate of 110 FPS does not match the second refresh rate of 240 Hz.

For another example, the plurality of optional screen refresh rates are 60 Hz, 120 Hz, and 240 Hz, and a predicted difference is 20% of the second screen refresh rate. If the current second refresh rate is 240 Hz and the detected current display frame rate is 220 FPS, because a difference of 20 between a value (that is, 240) of the second refresh rate and a value (that is, 220) of the current display frame rate is less than a preset difference of 240*20%=48, it is considered that the current display frame rate of 220 FPS matches the second refresh rate of 240 Hz. If the current second refresh rate is 120 Hz and the detected current display frame rate is 80 FPS, because a difference of 40 between a value (that is, 120) of the second refresh rate and a value (that is, 80) of the current display frame rate is not less than a preset difference of 120*20%=24, it is considered that the current display frame rate of 80 FPS does not match the second refresh rate of 120 Hz.

It may be understood that there are further a plurality of manners for determining whether the current display frame rate matches the second refresh rate. This is not limited herein.

S105: When determining that the current display frame rate does not match the second refresh rate, the electronic device updates the second refresh rate to the next screen refresh rate of the plurality of optional screen refresh rates in descending order of screen refresh rates.

When the electronic device determines that the current display frame rate does not match the second refresh rate, it indicates that the second refresh rate used as the current screen refresh rate is excessively high, and the output frame rate of the game application cannot reach a degree of the second refresh rate, so that the screen refresh rate can be reduced to save power. Therefore, the electronic device may update the second refresh rate to the next screen refresh rate of the plurality of optional screen refresh rates in descending order of screen refresh rates.

For example, the plurality of optional screen refresh rates are 60 Hz, 120 Hz, and 240 Hz. After 240 Hz is selected as the second refresh rate, a detected display frame rate is 110 FPS. In this case, it is determined that the display frame rate of 110 FPS does not match the second refresh rate of 240 Hz, the electronic device may update the second refresh rate to 120 Hz in descending order of screen refresh rates.

S106: The electronic device determines whether the second refresh rate is the first refresh rate.

After updating the second refresh rate, the electronic device determines whether the second refresh rate is the first refresh rate.

If the second refresh rate is the first refresh rate, it indicates that the screen refresh rate has been reduced to the lowest screen refresh rate or has been reduced to a screen refresh rate selected by a manufacture or the user by default. Even if the current display frame rate does not match the second refresh rate, the screen refresh rate cannot be further reduced or does not need to be further reduced. Therefore, it is unnecessary to detect whether the second screen refresh rate matches the current display frame rate. S107 may be directly performed to maintain the screen refresh rate as the second refresh rate.

If the second refresh rate is not the first refresh rate, it indicates that the screen refresh rate has not been reduced to the lowest screen refresh rate or has not been reduced to the screen refresh rate selected by the manufacture or the user by default. If the current display frame rate does not match the second refresh rate, the screen refresh rate may be further reduced to further save power consumption. Therefore, S104 may be performed again to detect whether an updated second refresh rate matches the current display frame rate.

For example, the plurality of optional screen refresh rates are 60 Hz, 120 Hz, and 240 Hz, and the first refresh rate is 120 Hz. After 240 Hz is set as the second refresh rate, if the detected current display frame rate is 110 FPS, the electronic device determines that the current display frame rate of 110 FPS does not match the second refresh rate of 240 Hz. The electronic device updates the second refresh rate to 120 Hz in descending order of screen refresh rates. After the updating, the electronic device determines that the second refresh rate of 120 Hz is the first refresh rate of 120 Hz. Therefore, S107 is directly performed to maintain the screen refresh rate as a default screen refresh rate of 120 Hz set by the manufacture or the user.

For example, the plurality of optional screen refresh rates are 60 Hz, 120 Hz, and 240 Hz, and the first refresh rate is 60 Hz. After 240 Hz is set as the second refresh rate, if the detected current display frame rate is 110 FPS, the electronic device determines that the current display frame rate of 110 FPS does not match the second refresh rate of 240 Hz. The electronic device updates the second refresh rate to 120 Hz in descending order of screen refresh rates, and after the updating, determines that the second refresh rate of 120 Hz is not the first refresh rate of 60 Hz. Therefore, S104 is performed again, and it is detected that the current display frame rate is 110 FPS and matches the updated second refresh rate of 120 Hz. S107 is performed to maintain the screen refresh rate as the updated second refresh rate of 120 Hz.

It may be understood that there may be different determining manners for the electronic device to determine whether the second refresh rate is the first refresh rate. There may be an explicit determining manner. For example, the second refresh rate is directly compared with the first refresh rate. Alternatively, there may be an implicit determining manner. For example, when the second refresh rate is updated to the next screen refresh rate of the plurality of optional screen refresh rates, whether the updated next screen refresh rate is the first refresh rate may be determined in a manner such as a default refresh rate identifier. There is no need to perform an independent action of determining whether the updated second refresh rate is the first refresh rate. Therefore, in some embodiments, operation S106 may not be performed as an action, but is merely status determining. This is not limited herein.

S107: When determining that current display frame rate matches the second refresh rate or the second refresh rate is the first refresh rate, maintain the screen refresh rate as the second refresh rate.

When it is determined that the current display frame rate matches the second refresh rate, it indicates that the second refresh rate is a screen refresh rate that best fits the output frame rate of the game application in the game scenario and that is of the plurality of optional screen refresh rates of a terminal. Using the second refresh rate can meet a display frame rate requirement in the game scenario, and does not waste power consumption.

When it is determined that the second refresh rate is the first refresh rate, it indicates that the updated second refresh rate has been reduced to the lowest screen refresh rate, and the refresh rate cannot be further reduced. Therefore, the screen refresh rate may be directly maintained as the second refresh rate. Alternatively, it indicates that although the updated second refresh rate has not been reduced to the lowest screen refresh rate, the updated second refresh rate has been reduced to the default refresh rate set by the manufacturer or the user, and is also a screen refresh rate commonly used by the user. Regardless of whether the current display frame rate can match the second refresh rate, it is not appropriate to further reduce the screen refresh rate to violate a user habit. Therefore, the screen refresh rate may also be directly maintained as the second refresh rate.

It may be understood that, when the electronic device determines to leave the game scenario, the electronic device may resume refreshing the display by using the first refresh rate.

In the conventional technology, to support a display effect of a high frame rate, the electronic device is usually set to fixedly refresh the display by using the highest screen refresh rate. However, in this embodiment of this application, when a commonly used interface or application is used, the electronic device refreshes the display by using the first refresh rate that is not the highest screen refresh rate. Because the used screen refresh rate is lower than the highest screen refresh rate, compared with always refreshing the display by using the highest screen refresh rate, refreshing the display by using the first refresh rate reduces power consumption.

Further, after detecting the game scenario, the electronic device first sets the current screen refresh rate to the highest screen refresh rate and detects whether the current display frame rate matches the current screen refresh rate. If the current display frame rate matches the current screen refresh rate, the current screen refresh rate is maintained. If the current display frame rate does not match the current screen refresh rate, the current screen refresh rate is updated to a next screen refresh rate in descending order of screen refresh rates, and detection is performed again, until it is detected that the current display frame rate matches the second refresh rate or the screen refresh rate is reduced to the first refresh rate commonly used by the user. Finally, there are three possibilities.

Possibility 1: If a finally determined matched screen refresh rate is the highest screen refresh rate, best experience of a high display frame rate can be provided.

Possibility 2: If a finally determined matched screen refresh rate is neither the highest screen refresh rate nor the first refresh rate, it indicates that the output frame rate of the game scenario still cannot reach a degree of matching the highest screen refresh rate. A best display frame rate supported in the game scenario can be reached by using the finally determined second refresh rate, so that best experience of a high display frame rate can be provided. In addition, because the used second refresh rate is lower than the highest screen refresh rate, compared with always refreshing the display by using the highest screen refresh rate, refreshing the display by using the second refresh rate also reduces power consumption.

Possibility 3: If a finally determined screen refresh rate is the first refresh rate, it indicates that the output frame rate of the game scenario can reach a maximum degree of matching the first refresh rate. A highest display frame rate that can be supported in the game scenario can be reached by using the first refresh rate, so that good experience of a display frame rate can be provided. In addition, because the used first refresh rate is lower than the highest screen refresh rate, compared with always refreshing the display by using the highest screen refresh rate, refreshing the display by using the first refresh rate also reduces power consumption.

With reference to the refresh rate switching method shown in FIG. 1, the following separately provides example descriptions by using different quantities of optional screen refresh rates and different situations of a first refresh rates as examples.

Case 1: There are two optional screen refresh rates, and the first refresh rate is a lowest screen refresh rate.

Figure 2A:
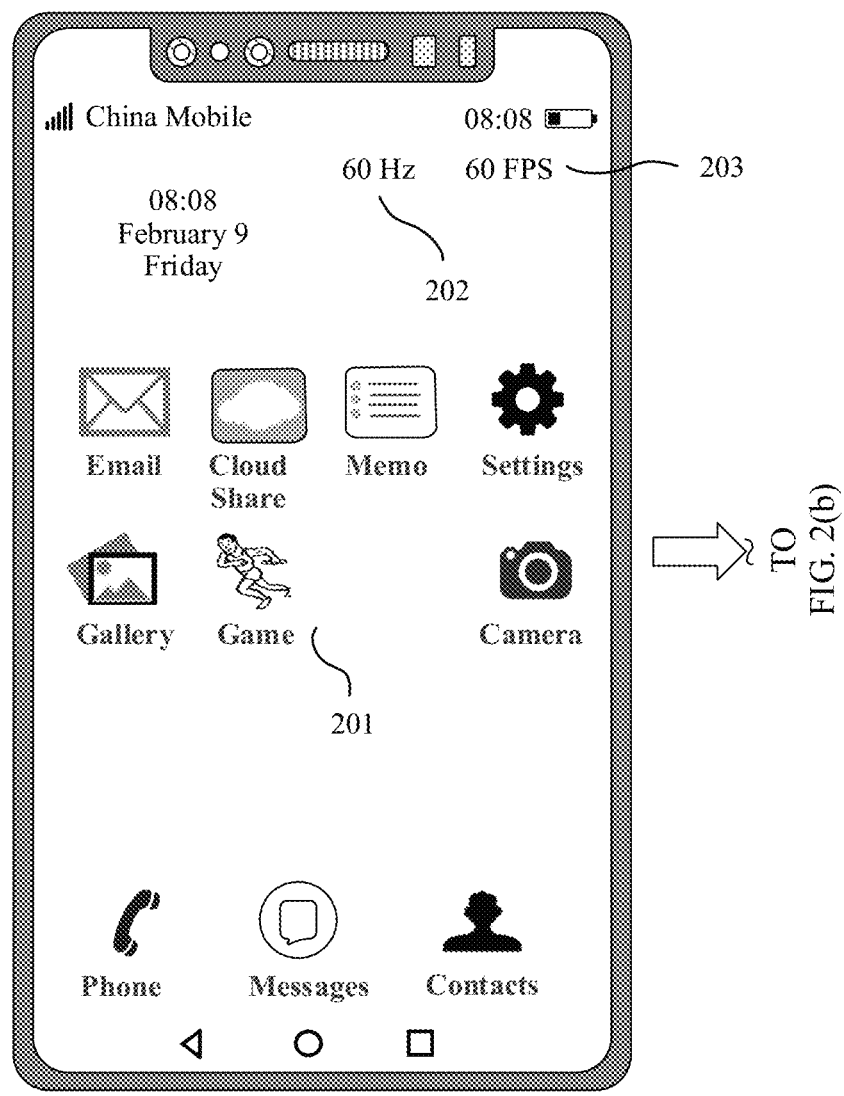
FIG. 2(a) and FIG. 2(b) are a schematic diagram of a group of interfaces of a refresh rate switching method according to an embodiment of this application.
Figure 2B:
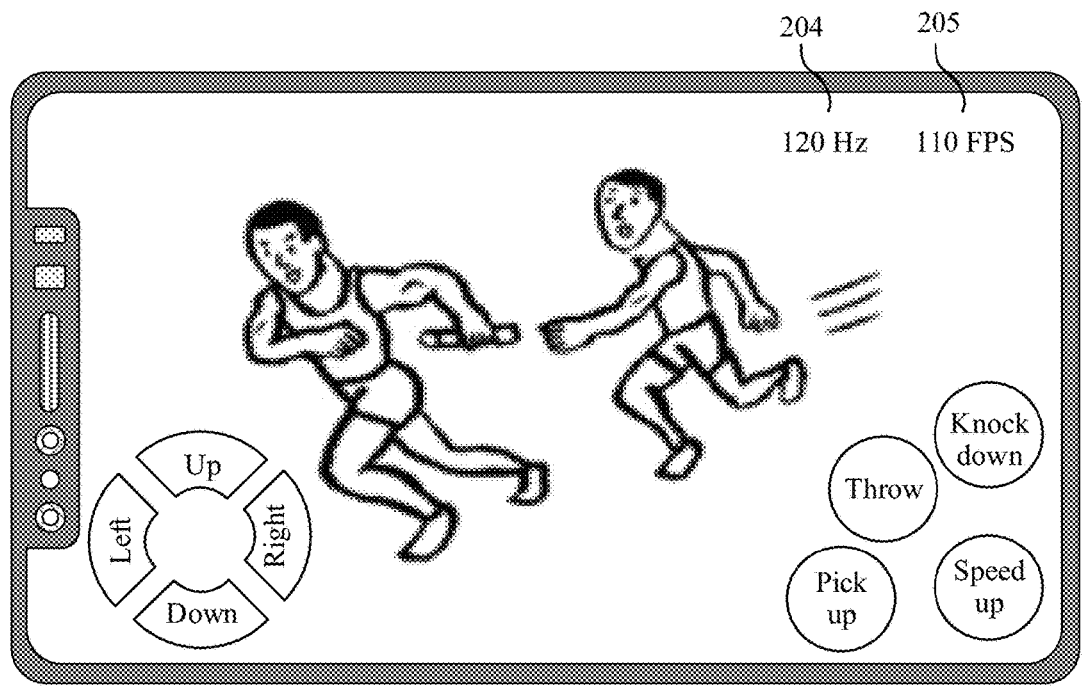

For example, FIG. 2(a) and FIG. 2(b) are a schematic diagram of a group of interfaces of a refresh rate switching method according to an embodiment of this application.

FIG. 2(a) is a schematic diagram of a home screen of an electronic device. A plurality of applications are displayed, for example, Email, Cloud Share, Memo, Settings, Gallery, Game 201, and Camera.

The electronic device has two optional screen refresh rates: 60 Hz and 120 Hz. 60 Hz corresponds to a frame rate range from 40 FPS to 60 FPS, and 120 Hz corresponds to a frame rate range from 100 FPS to 120 FPS. After detecting an operation of a user, the electronic device enables a screen refresh rate display function and a display frame rate display function, and both are displayed in an upper right corner of a screen. As shown in a screen refresh rate display area 202 in FIG. 2(a), when the home screen is displayed, a screen refresh rate of the electronic device is 60 Hz, that is, the electronic device refreshes a display by using the first refresh rate of 60 Hz. As shown in a display frame rate display area 203 in FIG. 2(a), when the home screen is displayed, a display frame rate of the home screen usually follows the screen refresh rate, in this case, the display frame rate of the electronic device is 60 FPS.

It may be understood that the electronic device determines whether the screen refresh rate matches a current display frame rate not only because the user enables the screen refresh display function and the display frame rate function by performing the operation. Even if the user does not enable the screen refresh display function and the display frame rate display function, the electronic device may also perform the refresh rate switching method shown in FIG. 1. Internally, the current display frame rate may be detected and the screen refresh rate may be determined, but the current display frame rate and the screen refresh rate are not necessarily to be displayed. Herein, only example display is provided for ease of understanding. In subsequent examples, a case in which the screen refresh rate display function and the display frame rate display function are enabled may also occur, which is also merely example display. Therefore, details are not described one by one.

FIG. 2(b) is a game interface after the user opens the game application 201. As shown in FIG. 2(b), the user opens the game application 201, and the electronic device determines that the current interface is a game scenario, and sets a current screen refresh rate as a highest screen refresh rate of 120 Hz, that is, sets a second refresh rate to the highest screen refresh rate. As shown in a screen refresh rate display area 204 in FIG. 2(b), in this case, the screen refresh rate is increased to 120 Hz. As shown in a display frame rate display area 205 in FIG. 2(b), a current display frame rate detected by the electronic device is 110 FPS. The electronic device determines that the current display frame rate of 110 FPS belongs to the frame rate range from 100 FPS to 120 FPS corresponding to the second refresh rate of 120 Hz, that is, the current display frame rate matches a current second refresh rate. Therefore, the electronic device maintains the screen refresh rate at the second refresh rate of 120 Hz.

When the electronic device leaves the game application and returns to display the home screen shown in FIG. 2(a), the electronic device continues to refresh the display by using the first refresh rate of 60 Hz, and the detected current display frame rate also returns to 60 FPS accordingly.

Figure 3A:
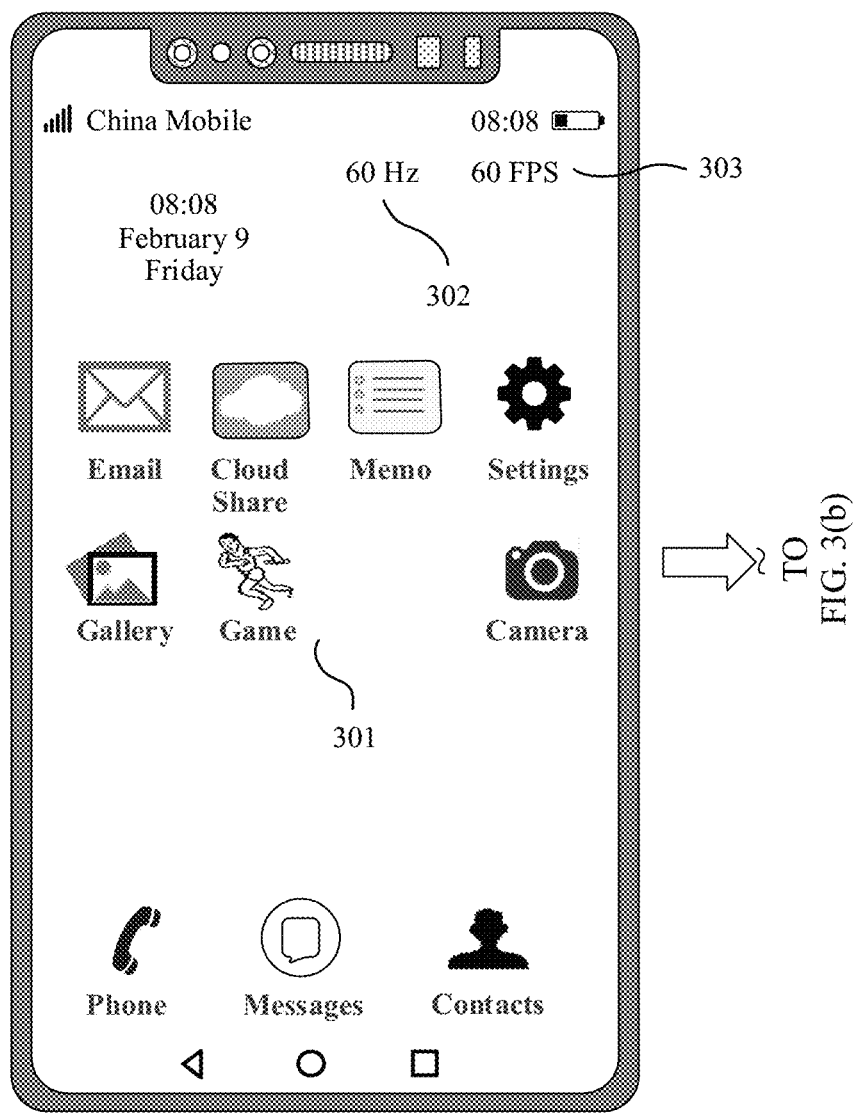
FIG. 3(a) to FIG. 3(c) are a schematic diagram of another group of interfaces of a refresh rate switching method according to an embodiment of this application.
Figure 3B:
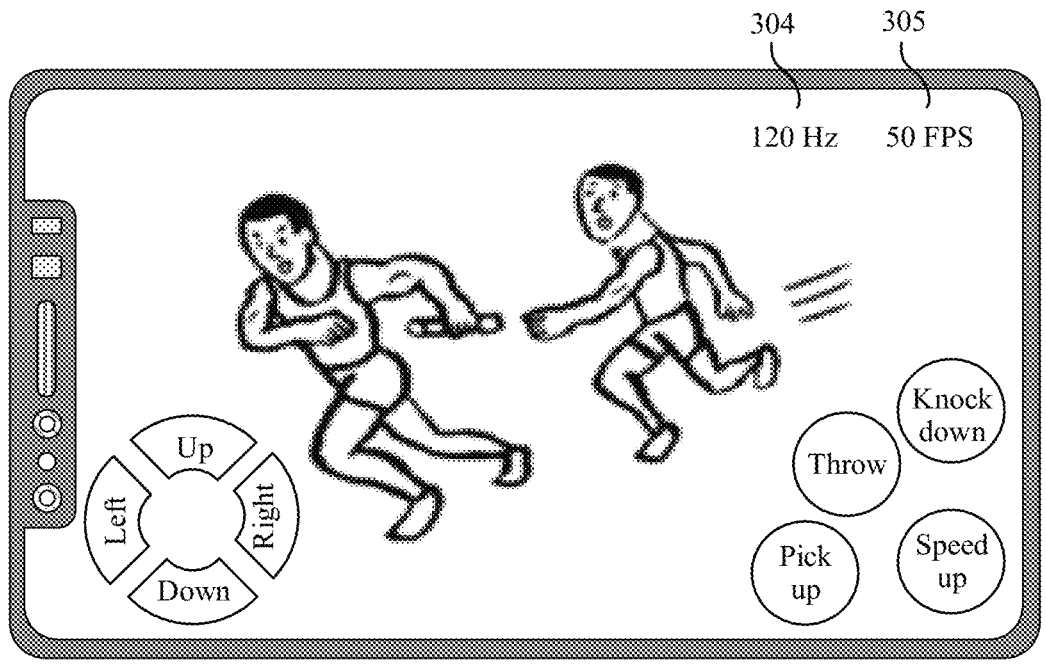
Figure 3C:
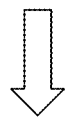
Figure 3C:
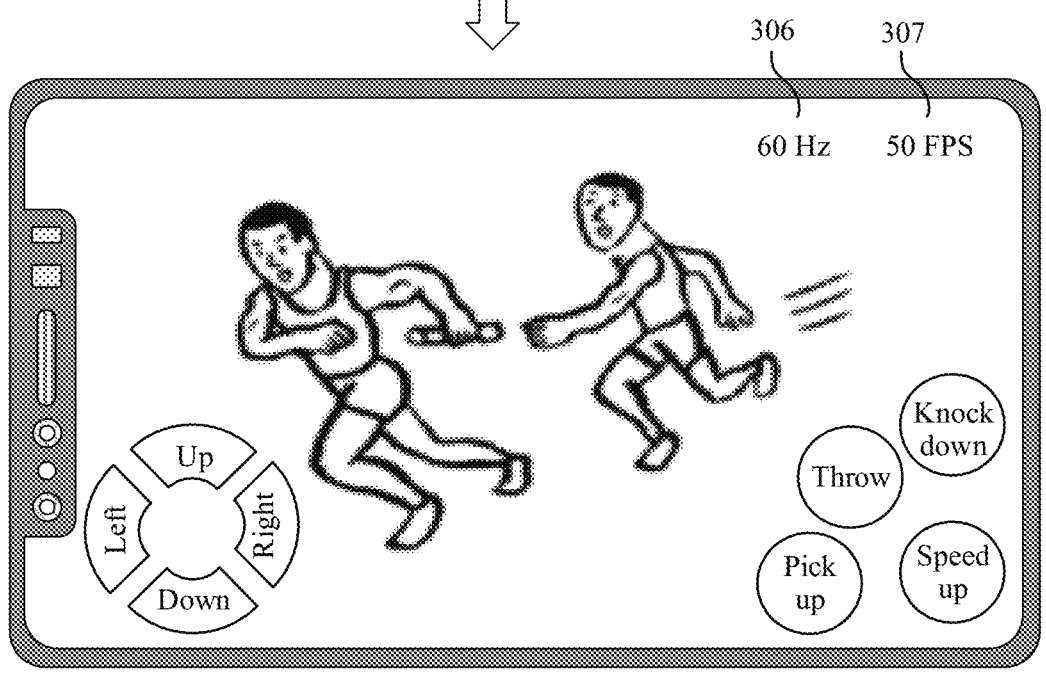
Figure 4A:
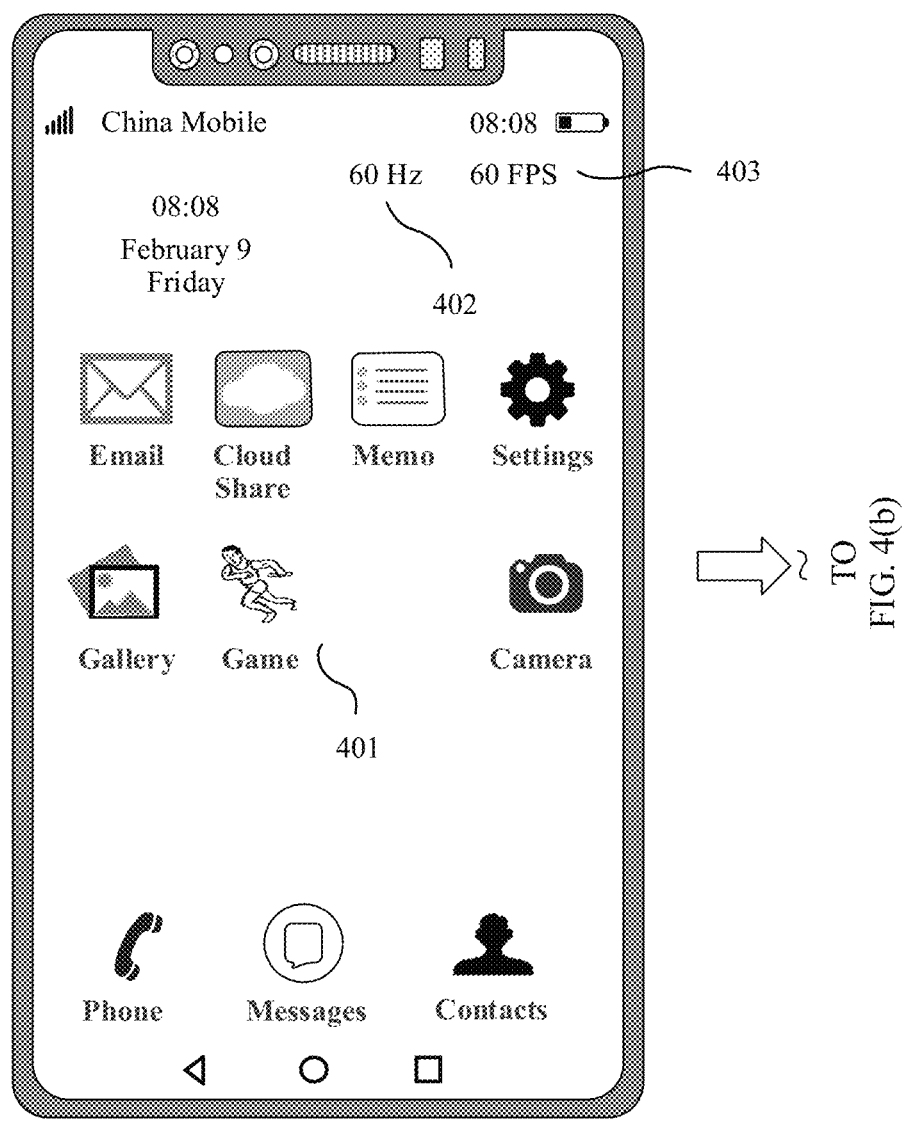
Figure 4D:
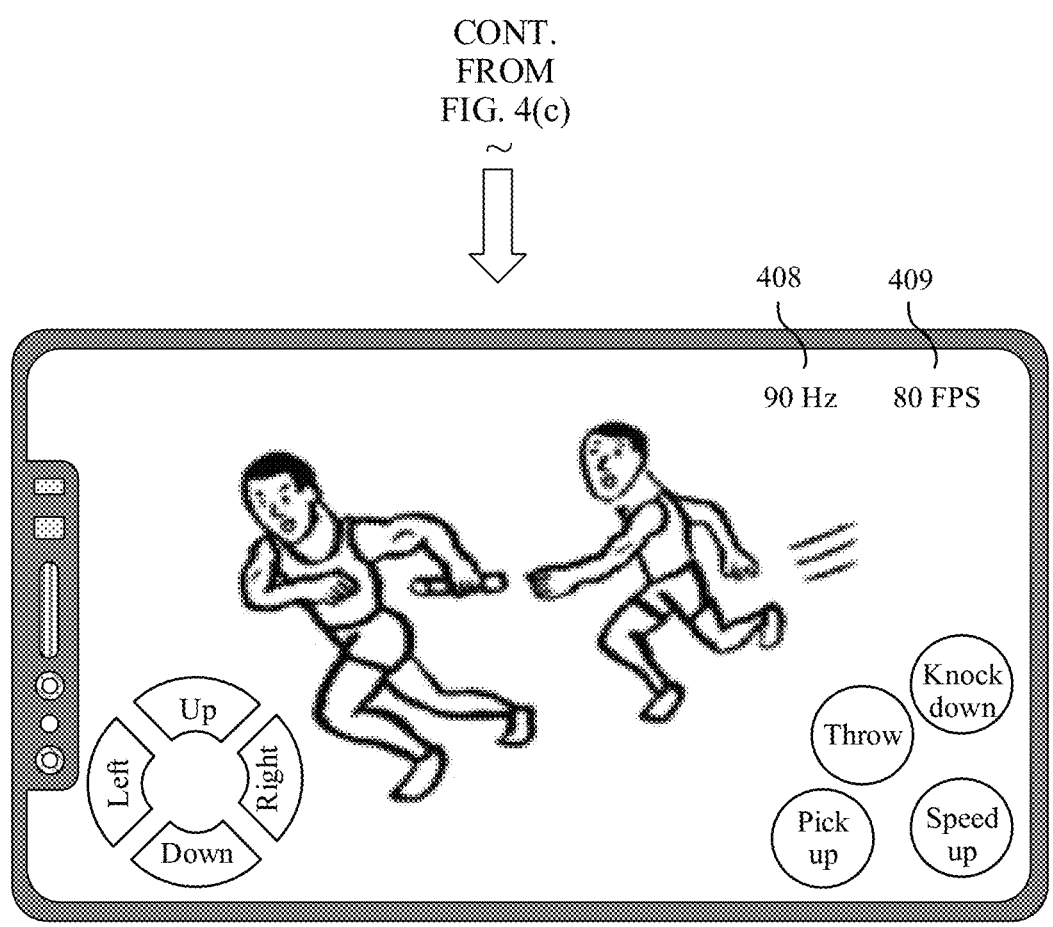

For example, FIG. 3(a) to FIG. 3(c) are a schematic diagram of another group of interfaces of a refresh rate switching method according to an embodiment of this application. An electronic device has two optional screen refresh rates: 60 Hz and 120 Hz. 60 Hz corresponds to a frame rate range from 40 FPS to 60 FPS, and 120 Hz corresponds to a frame rate range from 100 FPS to 120 FPS. After detecting an operation of a user, the electronic device enables a screen refresh rate display function and a display frame rate display function, and both are displayed in an upper right corner of a screen. As shown in a screen refresh rate display area 302 in FIG. 3(a), when the home screen is displayed, a screen refresh rate of the electronic device is 60 Hz, that is, the electronic device refreshes a display by using the first refresh rate of 60 Hz. As shown in a display frame rate display area 303 in FIG. 3(a), when the home screen is displayed, because the display frame rate of the home screen usually follows the screen refresh rate, in this case, the display frame rate of the electronic device is 60 FPS.

FIG. 2(b) is a game interface after a user opens a game application 301. As shown in FIG. 3(b), after the user opens the game application 201, the electronic device determines that the current surface is a game scenario, and sets a current screen refresh rate as a highest screen refresh rate of 120 Hz, that is, sets a second refresh rate to the highest screen refresh rate. As shown in a screen refresh rate display area 304 in FIG. 3(b), in this case, the screen refresh rate is increased to 120 Hz. As shown in a display frame rate display area 305 in FIG. 3(b), a current display frame rate detected by the electronic device is 50 FPS. The electronic device determines that the current display frame rate 50 FPS does not belong to the frame rate range from 100 FPS to 120 FPS corresponding to the second refresh rate of 120 Hz and updates the second refresh rate to a next screen refresh rate of 60 Hz of the plurality of optional screen refresh rates based on operation S105 in the method shown in FIG. 1. Because 60 Hz is the first refresh rate, based on operation S107 in the method shown in FIG. 1, the electronic device directly maintains the screen refresh rate as the second refresh rate of 60 Hz. As shown in a screen refresh rate display area 306 in FIG. 3(c), in this case, the screen refresh rate is 60 Hz. As shown in a display frame rate display area 307 in FIG. 3(c), a current display frame rate of the electronic device is still 50 FPS.

When the electronic device leaves the game application and returns to display the home screen shown in FIG. 3(a), the electronic device continues to refresh the display by using the first refresh rate of 60 Hz, and the detected current display frame rate also returns to 60 FPS accordingly.

Case 2: There are more than two optional screen refresh rates, and the first refresh rate is a lowest screen refresh rate.

For example, FIG. 4(a) to FIG. 4(d) are a schematic diagram of another group of interfaces of a refresh rate switching method according to an embodiment of this application.

An electronic device has four optional screen refresh rates: 60 Hz, 90 Hz, 120 Hz, and 240 Hz. 60 Hz corresponds to a frame rate range from 40 FPS to 60 FPS, 90 Hz corresponds to a frame rate range from 75 FPS to 90 FPS, 120 Hz corresponds to a frame rate range from 100 FPS to 120 FPS, and 240 Hz corresponds to a frame rate range from 200 FPS to 240 FPS. After detecting an operation of a user, the electronic device enables a screen refresh rate display function and a display frame rate display function, and both are displayed in an upper right corner of a screen. As shown in a screen refresh rate display area 402 in FIG. 4(a), when the home screen is displayed, a screen refresh rate of the electronic device is 60 Hz, that is, the electronic device refreshes a display by using the first refresh rate of 60 Hz. As shown in a display frame rate display area 403 in FIG. 4(a), when the home screen is displayed, because the display frame rate of the home screen usually follows the screen refresh rate, in this case, the display frame rate of the electronic device is 60 FPS.

FIG. 4(b) is a game interface after a user opens a game application 401. As shown in FIG. 4(b), after the user opens the game application 401, the electronic device determines that the current surface is a game scenario, and sets a current screen refresh rate as a highest screen refresh rate of 240 Hz, that is, determines a second refresh rate as the highest screen refresh rate. As shown in a screen refresh rate display area 404 in FIG. 4(b), in this case, the screen refresh rate is increased to 240 Hz. As shown in a display frame rate display area 405 in FIG. 4(b), a current display frame rate detected by the electronic device is 70 FPS. The electronic device determines that the display frame rate 70 FPS does not belong to the frame rate range from 200 FPS to 240 FPS corresponding to the second refresh rate of 240 Hz and determines that the current display frame rate does not match the second refresh rate. Based on operation S105 in the refresh rate switching method in the embodiment shown in FIG. 1, the second refresh rate is updated to a next screen refresh rate of 120 Hz of the plurality of optional screen refresh rates. The second refresh rate of 120 Hz is not the first refresh rate of 60 Hz, and it is again determined, based on operation S104 in the refresh rate switching method in the embodiment shown in FIG. 1, whether the current display frame rate matches the second refresh rate.

As shown in a screen refresh rate display area 406 in FIG. 4(c), in this case, the screen refresh rate is updated to 120 Hz. As shown in a display frame rate display area 405 in FIG. 4(c), a current display frame rate detected by the electronic device is 75 FPS. The electronic device determines that the display frame rate 75 FPS does not belong to the frame rate range from 100 FPS to 120 FPS corresponding to the second refresh rate of 120 Hz, and determines that the current display frame does not match the second refresh rate. Based on operation S105 in the refresh rate switching method in the embodiment shown in FIG. 1, the second refresh rate is updated to a next screen refresh rate of 90 Hz of the plurality of optional screen refresh rates. The second refresh rate of 90 Hz is not the first refresh rate of 60 Hz, and it is again determined, based on operation S104 in the refresh rate switching method in the embodiment shown in FIG. 1, whether the current display frame rate matches the second refresh rate.

As shown in a screen refresh rate display area 408 in FIG. 4(*d*), in this case, the screen refresh rate is updated to 90 Hz. As shown in a display frame rate display area 409 in FIG. 4(*d*), a current display frame rate detected by the electronic device is 80 FPS. The electronic device determines that the current display frame rate of 80 FPS belongs to the frame rate range from 75 FPS to 90 FPS corresponding to the second refresh rate of 90 Hz, and determines that the current display frame rate matches the second refresh rate. Based on operation S107 in the refresh rate switching method in the embodiment shown in FIG. 1, the electronic device maintains the screen refresh rate at the second refresh rate of 90 Hz.

When the electronic device leaves the game application and returns to display the home screen shown in FIG. 4(*a*), the electronic device continues to refresh the display by using the first refresh rate of 60 Hz, and the display frame rate also returns to 60 FPS accordingly.

Case 3: There are more than two optional screen refresh rates, and the first refresh rate is not a lowest screen refresh rate.

For example, an electronic device has four optional screen refresh rates: 60 Hz, 90 Hz, 120 Hz, and 240 Hz. 60 Hz corresponds to a frame rate range from 40 FPS to 60 FPS, 90 Hz corresponds to a frame rate range from 75 FPS to 90 FPS, 120 Hz corresponds to a frame rate range from 100 FPS to 120 FPS, and 240 Hz corresponds to a frame rate range from 200 FPS to 240 FPS. A default screen refresh rate of 90 Hz selected by the user is usually used on an interface or an application of the electronic device, and the electronic device refreshes the display by using the 90 Hz as the first refresh rate.

When a user opens a game application and a display image is detected as a game scenario, the electronic device increases a screen refresh rate to 240 Hz that is the highest, and uses the 240 Hz as the second refresh rate, to refresh the display. Based on operation S103 in the refresh rate switching method in the embodiment shown in FIG. 1, the electronic device detects that a current display frame rate is 80 FPS, and determines that the detected current display frame rate does not belong to the frame rate range from 200 FPS to 240 FPS corresponding to the second refresh rate of 240 Hz. The current display frame rate does not match the second refresh rate. Based on operation S105 in the refresh rate switching method in the embodiment shown in FIG. 1, the second refresh rate is updated to a next screen refresh rate of 120 Hz of the plurality of optional screen refresh rates.

The second refresh rate of 120 Hz is not the first refresh rate of 90 Hz, and it is again determined, based on operation S104 in the refresh rate switching method in the embodiment shown in FIG. 1, that the current display frame rate is 82 Hz and does not belong to the frame rate range from 100 FPS to 120 FPS corresponding to the second refresh rate of 120 Hz, and the current display frame rate does not match the second refresh rate. Based on operation S105 in the refresh rate switching method in the embodiment shown in FIG. 1, the second refresh rate is updated to a next screen refresh rate of 90 Hz of the plurality of optional screen refresh rates. Based on an identifier of the default refresh rate selected by the user, the electronic device can determine that the second refresh rate of 90 Hz is not the lowest screen refresh rate but is the first refresh rate used by the user by default. Based on operation S107 in the refresh rate switching method in the embodiment shown in FIG. 1, the electronic device maintains the screen refresh rate at the second refresh rate of 90 Hz.

When the electronic device leaves the game application and returns to the home screen or another application, the electronic device continues to refresh the display by using the first refresh rate of 90 Hz, and the display frame rate also returns to 90 FPS accordingly.

(2) Touch Scenario

Figure 5:
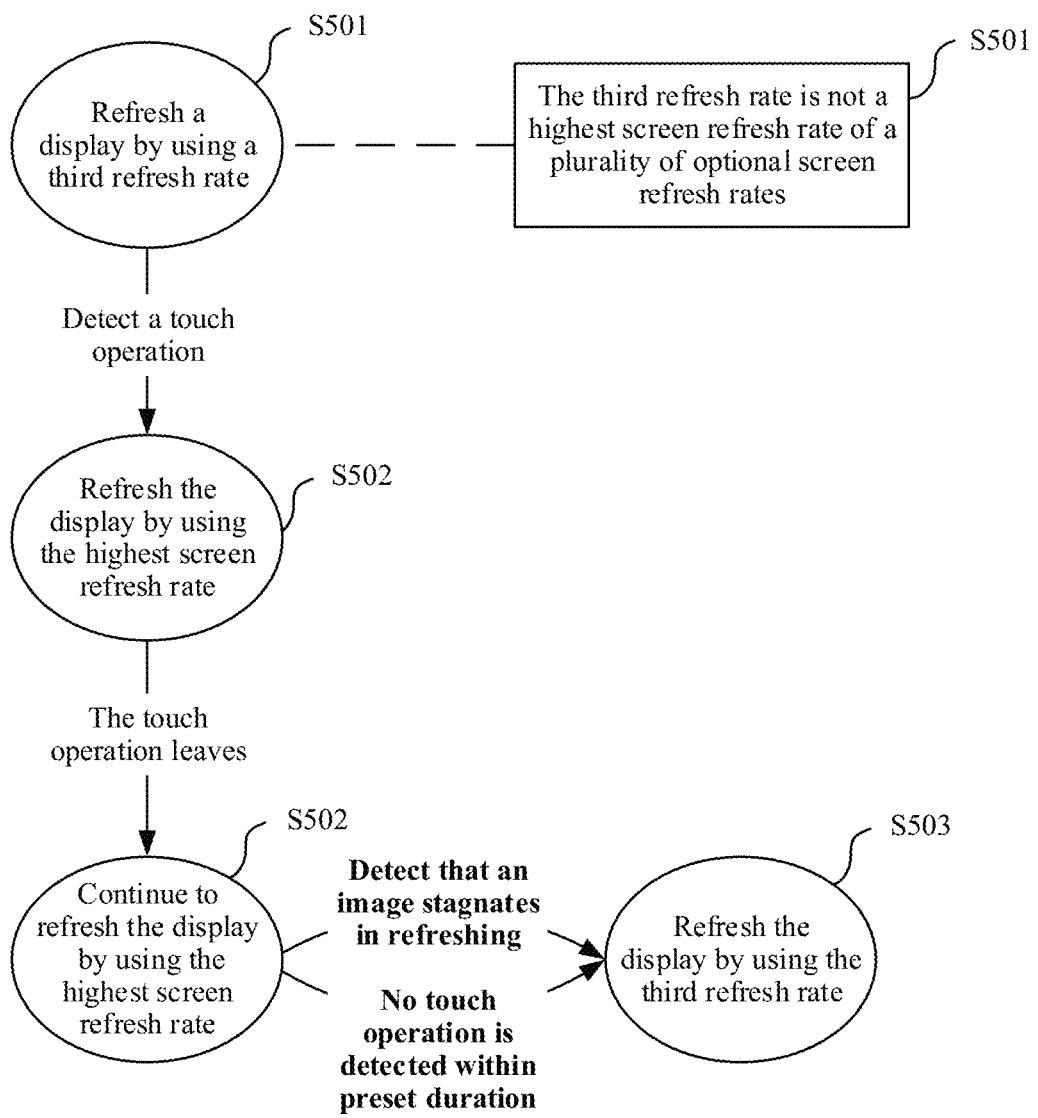
FIG. 5 is a schematic diagram of another change of a refresh rate status according to an embodiment of this application.

FIG. 5 is a schematic diagram of another change of a refresh rate status according to an embodiment of this application.

S501: An electronic device refreshes a display by using a third refresh rate, where the third refresh rate is not a highest screen refresh rate of a plurality of optional screen refresh rates of the electronic device.

When an image stagnates in refreshing or no touch is detected, the electronic device refreshes the display by using the third refresh rate. The electronic device has the plurality of optional screen refresh rates, and the electronic device currently refreshes the display by using the third refresh rate that is not the highest screen refresh rate.

In some embodiments, the third refresh rate may be a lowest screen refresh rate of the plurality of optional screen refresh rates. For example, the plurality of optional screen refresh rates are 60 Hz and 90 Hz, and the first refresh rate may be 60 Hz. For another example, the plurality of optional screen refresh rates are 60 Hz, 90 Hz, and 120 Hz, and the third refresh rate may be 60 Hz.

In some embodiments, the third refresh rate may alternatively not be the lowest screen refresh rate of the plurality of optional screen refresh rates. For example, the plurality of optional screen refresh rates are 60 Hz, 90 Hz, and 120 Hz, and the third refresh rate may be 90 Hz. For another example, the plurality of optional screen refresh rates are 60 Hz, 90 Hz, 120 Hz, and 240 Hz, and the third refresh rate may be 90 Hz or 120 Hz.

It may be understood that the third refresh rate may be a factory default screen refresh rate of the electronic device or may be a daily used screen refresh rate selected by a user from the plurality of optional screen refresh rates. This is not limited herein.

S502: When detecting a touch operation entered by the user, the electronic device refreshes the display by using the highest screen refresh rate.

When the touch operation entered by the user is detected, the touch operation usually causes refresh and a dynamic change of a display image. For example, a slide operation may cause sliding of the image, and a tap operation may cause opening of a new interface. To make these dynamically changing images smoother, the electronic device may refresh the display by using the highest screen refresh rate of the plurality of optional screen refresh rates. Because an output frame rate of a common interface or an application is adjusted according to a screen refresh rate used by a system, a display frame rate of the image is also increased to a correspondingly relatively high display frame rate when the highest screen refresh rate is used, so that a dynamic image change process is smoother.

S503: After detecting that the touch operation leaves, when detecting that the image stagnates in refreshing or no touch operation is detected within preset duration, the electronic device refreshes the display by using the third refresh rate.

After detecting that the touch operation leaves, the electronic device does not immediately restore a low refresh rate, but continues to refresh the display by using the highest screen refresh rate. The touch control operation leaves, but impact brought by the touch control operation does not necessarily end. Therefore, the image may still dynamically change. For example, after the slide operation, a finger leaves, but the image continues to slide for a while; or after the tap operation, a finger leaves, but a newly opened interface may continue to be loaded.

When it is detected that the image stagnates in refreshing, it indicates that the image does not need to be further refreshed, and the impact caused by the touch operation has ended. The electronic device refreshes the display by using a relatively low third refresh rate, to reduce power consumption.

In some cases, the electronic device may detect that the image does not stagnate in refreshing all the time. In this case, it is very likely that the electronic device is playing a video, but the highest screen refresh rate and a highest display frame rate do not need to be used to play the video, and a relatively good effect can be achieved by using a commonly used screen refresh rate and display frame rate. Therefore, the preset duration is further set in the electronic device. When no new touch operation is detected within the preset duration after the touch leaves, the electronic device also adjusts to refresh the display by using the third refresh rate, to reduce power consumption.

There are a plurality of manners for determining the preset duration. For example, the preset duration may be directly set by the user, or a piece of empirical data may be set by a manufacturer through an experiment. This is not limited herein.

For example, a worker may simulate a large quantity of touch scenarios in a lab, such as 10,000 slide operations and 10,000 tap operations, and then obtain duration of image dynamically refreshing caused by the operations. A touch curve is drawn by using the obtained data, and then maximum duration in which image dynamically refreshing may last due to a touch operation is obtained through human factor analysis and used as an experimental value. Finally, the preset duration is set based on the experimental value. For example, the experimental value obtained according to the method is 4.75 seconds, that is, image dynamically refreshing caused by most touch operations ends within 4.75 seconds through analysis of a touch curve drawn by using the obtained data. In this case, when the electronic device is set at delivery, the preset duration may be set to 5 seconds.

In this embodiment of this application, when the image stagnates in refreshing or no touch operation is detected, the electronic device refreshes the display by using the third refresh rate that is not the highest screen refresh rate. Because the used screen refresh rate is lower than the highest screen refresh rate, compared with always refreshing the display by using the highest screen refresh rate, this reduces power consumption. When detecting the touch operation, the electronic device adjusts the screen refresh rate to the highest screen refresh rate, to provide the user with good experience of a high frame rate in such a high frame rate scenario. Until the touch operation leaves and it is detected that the image stagnates in refreshing, or after the touch operation leaves and no touch operation is detected within the preset duration, the screen refresh rate is adjusted to the third refresh rate. In such a standard frame rate scenario, a commonly used third refresh rate set by a factory or the user continues to be used to reduce power consumption. In this way, experience of a high display frame rate is provided for the user in the high frame rate scenario, and power consumption is not wasted in the standard frame rate scenario, thereby reducing power consumption of an entire system.

With reference to the refresh rate switching method in the embodiment shown in FIG. 5, the following separately provides example descriptions by using different situations as examples in which a moment at which the image stagnates in refreshing is detected and a moment at which no touch operation is detected within the preset duration.

Case 1: After the touch operation leaves, it is detected, within the preset duration, that the image stagnates in refreshing.

Figures 6C, 6D:
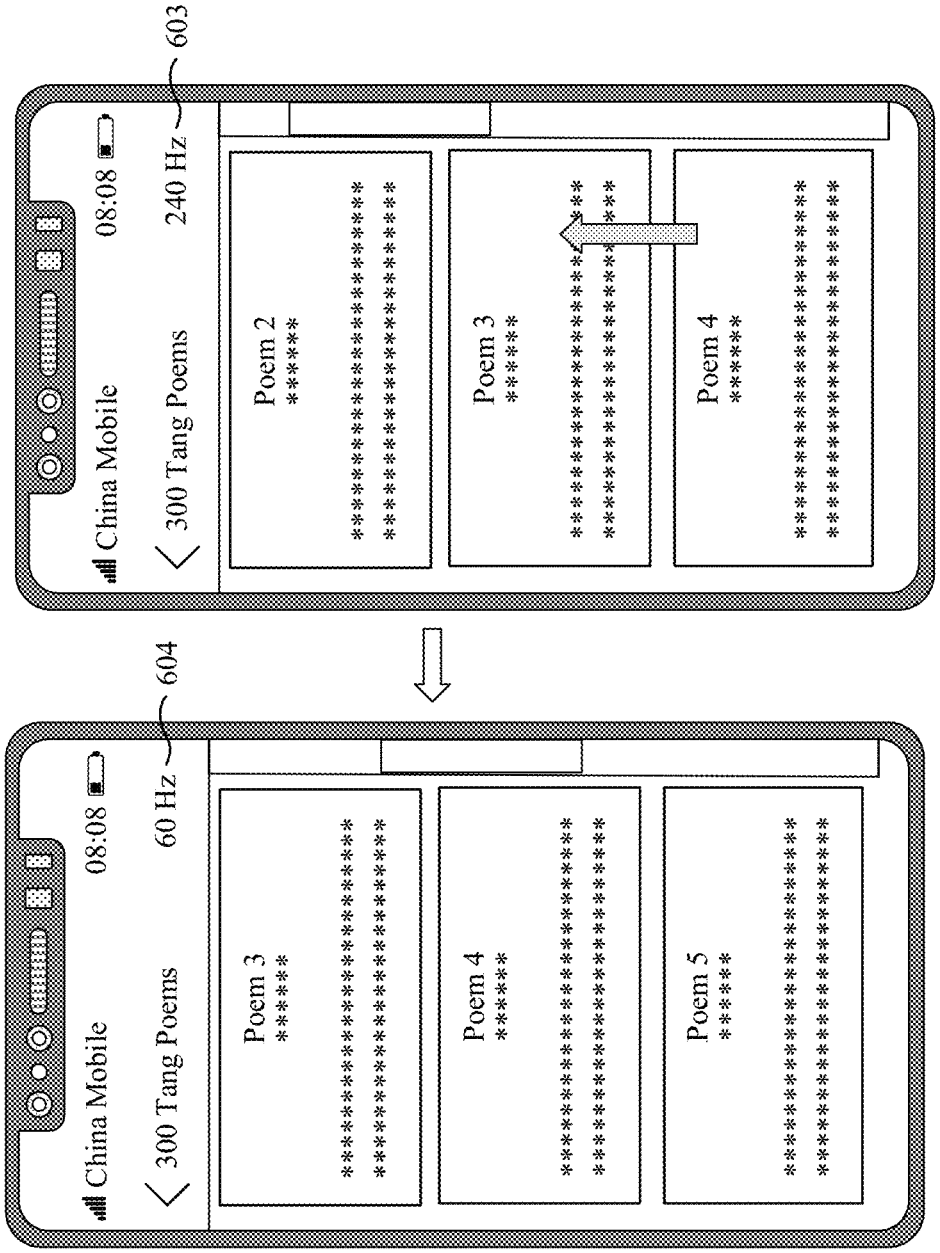

For example, FIG. 6(*a*) to FIG. 6(*d*) are a schematic diagram of another group of interfaces of a refresh rate switching method according to an embodiment of this application.

FIG. 6(*a*) is a schematic diagram of an interface on which the electronic device displays an article named 300 Tang Poems. A screen refresh rate display function is enabled on the electronic device and is displayed in an upper right corner of a screen. The electronic device has three optional screen refresh rates: 60 Hz, 120 Hz, and 240 Hz. The user sets 60 Hz as the commonly used screen refresh rate, that is, sets 60 Hz as the third refresh rate in operation S501 of the refresh rate switching method in the embodiment shown in FIG. 5. The preset duration in operation S503 of the refresh rate switching method in the embodiment shown in FIG. 5 is set to 5 seconds before delivery.

As shown in a screen refresh rate display area 601 in FIG. 6(*a*), in this case, the screen refresh rate of the electronic device is 60 Hz. As described in operation S501 in the refresh rate switching method in the embodiment shown in FIG. 5, the electronic device refreshes the display by using 60 Hz as the third refresh rate.

As shown in FIG. 6(*b*), the user touches the screen and slides up. Based on operation S501 in the refresh rate switching method in the embodiment shown in FIG. 5, after detecting the touch operation, the electronic device adjusts to a highest screen refresh rate of 240 Hz to refresh the display. As shown in a screen refresh rate display area 602 in FIG. 6(*b*), in this case, the screen refresh rate of the electronic device is adjusted to the highest screen refresh rate of 240 Hz.

One second after the touch operation leaves, impact of the slide touch operation on the display image does not disappear. As shown in FIG. 6(*c*), the display image further continues to slide upward. As shown in a screen refresh rate display area 603 in FIG. 6(*b*), in this case, the screen refresh rate of the electronic device still maintains the highest screen refresh rate of 240 Hz.

Three seconds after the touch operation leaves, sliding of the display image stops. Based on operation S503 in the refresh rate switching method in the embodiment shown in FIG. 5, the electronic device detects that the image stagnates in refreshing, and refreshes the display by using the third refresh rate of 60 Hz. As shown in FIG. 6(*d*), in this case, the screen refresh rate of the electronic device is adjusted to the third refresh rate of 60 Hz.

Case 2: After the touch operation leaves, it is not detected, within the preset duration, that the image stagnates in refreshing, and the touch operation is not detected either.

For example, the electronic device has four optional screen refresh rates: 60 Hz, 90 Hz, 120 Hz, and 240 Hz. 90 Hz is set as a commonly used screen refresh rate at delivery, that is, 90 Hz is set as the third refresh rate in operation S501 of the refresh rate switching method in the embodiment shown in FIG. 5. The preset duration in operation S503 of the refresh rate switching method in the embodiment shown in FIG. 5 is set to 5 seconds before delivery.

On a display interface of an application, a video player control and a corresponding text introduction are displayed. In this case, the electronic device refreshes the display by using the third refresh rate of 90 Hz.

The user taps the video player control. Based on operation S501 in the refresh rate switching method in the embodiment shown in FIG. 5, after detecting the touch operation, the electronic device adjusts to the highest screen refresh rate of 240 Hz to refresh the display.

The finger of the user has left the screen, but the electronic device plays the video. Because the video is displayed in a dynamic image, the electronic device does not detect that the image stagnates in refreshing.

After the finger of the user leaves the screen for five seconds, based on operation S503 in the refresh rate switching method in the embodiment shown in FIG. 5, the electronic device determines that the touch operation has left the screen for preset duration of five seconds, and no image stagnation refresh and no new touch operation of the user are detected within the five seconds, the electronic device refreshes the display by adjusting and using the third refresh rate of 90 Hz.

The following describes an example of an electronic device 100 provided in an embodiment of this application.

Figure 7:
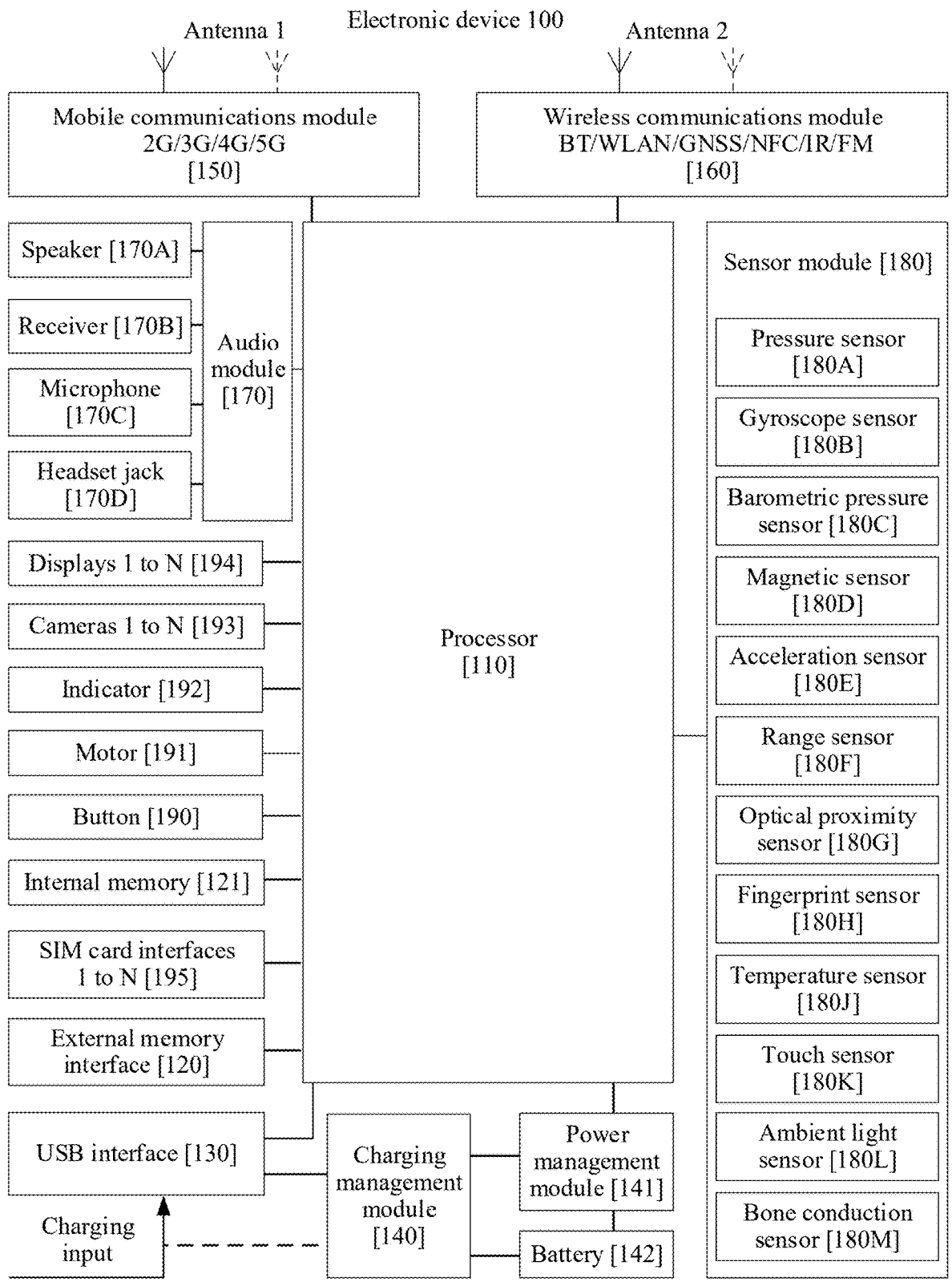
FIG. 7 is a schematic diagram of a structure of an electronic device according to an embodiment of this application.

FIG. 7 is a schematic diagram of a structure of the electronic device 100 according to this embodiment of this application.

The electronic device 100 is used as an example below to describe embodiments in detail. It should be understood that the electronic device 100 may have more or fewer components than those shown in the figure, or may combine two or more components, or may have different component configurations. Components shown in the figure may be implemented by hardware, software, or a combination of hardware and software that includes one or more signal processing and/or application-specific integrated circuits.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present application does not constitute a limitation on the electronic device 100. In some other embodiments of this application, the electronic device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural network processing unit (NPU), and/or the like. Different processing units may be independent components, or may be integrated into one or more processors.

The controller may be a nerve center and a command center of the electronic device 100. The controller may generate an operation control signal based on instruction operation code and a time sequence signal, to control instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronous serial bus, including a serial data line (SDA) and a serial clock line (SCL). In some embodiments, the processor 110 may include a plurality of groups of I2C buses. The processor 110 may be separately coupled to the touch sensor 180K, a charger, a flash light, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be configured to: perform audio communication, and sample, quantize, and code an analog signal. In some embodiments, the audio module 170 may be coupled to the wireless communications module 160 through the PCM bus interface. In some embodiments, the audio module 170 may alternatively transmit an audio signal to the wireless communications module 160 through the PCM interface, to implement a function of answering a call by using a Bluetooth headset. Both the I2S interface and the PCM interface may be configured to perform audio communication.

The UART interface is a universal serial data bus and is configured to perform asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as an I2C interface, an I2S interface, a UART interface, an MIPI interface, or the like.

The SIM interface may be configured to communicate with the SIM card interface 195, to implement a function of transmitting data to an SIM card or reading data in an SIM card.

The USB interface 130 is an interface that conforms to USB standard specifications and may be a mini USB interface, a micro USB interface, a USB Type-C interface, or the like. The USB interface 130 may be configured to connect to the charger to charge the electronic device 100 or may be configured to transmit data between the electronic device 100 and a peripheral device or may be configured to connect to a headset to play audio by using the headset. The interface may be further configured to connect to another electronic device such as an AR device.

It may be understood that an interface connection relationship between the modules that is shown in this embodiment of the present application is merely an example for description, and does not constitute a limitation on the structure of the electronic device 100. In some other embodiments of this application, the electronic device 100 may alternatively use an interface connection manner different from that in the foregoing embodiment, or may use a combination of a plurality of interface connection manners.

The charging management module 140 is configured to receive a charging input from the charger. The charger may be a wireless charger or a wired charger.

The power management module 141 is configured to connect to the battery 142 and the charging management module 140 to the processor 110. The power management module 141 receives an input of the battery 142 and/or the charging management module 140, and supplies power to the processor 110, the internal memory 121, an external memory, the display 194, the camera 193, the wireless communications module 160, and the like.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communications frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 150 can provide a solution, applied to the electronic device 100, to wireless communication including 2G, 3G, 4G, 5G, and the like. The mobile communications module 150 may include at least one filter, a switch, a power amplifier, a low noise amplifier (LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor and convert an amplified signal into an electromagnetic wave for radiation through the antenna 1. In some embodiments, at least some function modules in the mobile communications module 150 may be disposed in the processor 110. In some embodiments, at least some function modules in the mobile communications module 150 may be disposed in a same device as at least some modules in the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110 and is disposed in a same device as the mobile communications module 150 or another function module.

The wireless communications module 160 may provide a solution, applied to the electronic device 100, to wireless communication including a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, and the like. The wireless communications module 160 may be one or more components integrating at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 and the mobile communications module 150 are coupled, and the antenna 2 and the wireless communications module 160 are coupled, so that the electronic device 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 may implement a display function by using the GPU, the display 194, the application processor, and the like. The GPU is a microprocessor for image processing and is connected to the display 194 to the application processor. The GPU is configured to: perform mathematical and geometric computation and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device 100 may include one or N displays 194, where N is a positive integer greater than 1. The display 194 supports the plurality of optional screen refresh rates in the foregoing embodiment.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal and may further process another digital signal in addition to the digital image signal. For example, when the electronic device 100 selects a frequency, the digital signal processor is configured to perform Fourier transform on frequency energy.

The video codec is configured to compress or decompress a digital video. The electronic device 100 may support one or more video codecs. In this way, the electronic device 100 may play or record videos in a plurality of coding formats, for example, moving picture experts group (MPEG)-1, MPEG-2, MPEG-3, and MPEG-4.

The NPU is a neural network (NN) computing processor, quickly processes input information by referring to a structure of a biological neural network, for example, by referring to a mode of transmission between human brain neurons, and may further continuously perform self-learning. The NPU can implement applications such as intelligent cognition of the electronic device 100, such as image recognition, facial recognition, speech recognition, and text understanding.

The external memory interface 120 may be configured to connect to an external memory card, for example, a micro SD card, to extend a storage capability of the electronic device 100. The external memory card communicates with the processor 110 through the external memory interface 120, to implement a data storage function. For example, files such as music and a video are stored in the external memory card.

The internal memory 121 may be configured to store computer-executable program code, and the computer-executable program code includes instructions. The processor 110 runs the instructions stored in the internal memory 121 to perform various function applications of the electronic device 100 and data processing. The internal memory 121 may include a program storage area and a data storage area. The program storage area may store an operating system, an application required by at least one function (for example, a facial recognition function, a fingerprint recognition function, and a mobile payment function), and the like. The data storage area may store data (for example, facial information template data and a fingerprint information template) and the like created when the electronic device 100 is used. In addition, the internal memory 121 may include a high-speed random access memory, or may include a nonvolatile memory such as at least one disk storage device, a flash memory, or a universal flash storage (UFS).

The electronic device 100 may implement an audio function such as music playing or recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some function modules in the audio module 170 are disposed in the processor 110.

The speaker 170A, also referred to as a "horn", is configured to convert an audio electrical signal into a sound signal. The electronic device 100 may listen to music or answer a call in a hands-free mode by using the speaker 170A.

The receiver 170B, also referred to as an "earpiece", is configured to convert an audio electrical signal into a sound signal. When a call is answered or voice information is received by using the electronic device 100, the receiver 170B may be put close to a human ear to listen to a voice.

The microphone 170C, also referred to as a "mike" or a "microphone", is configured to convert a sound signal into an electrical signal. When making a call or sending voice information, a user may make a sound near the microphone 170C through the mouth of the user, to enter a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, identify a sound source, implement a directional recording function, and the like.

The headset jack 170D is configured to connect to a wired headset. The headset jack 170D may be the USB interface 130, or may be a 3.5 mm open mobile terminal platform (OMTP) standard interface or cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, for example, a resistive pressure sensor, an inductive pressure sensor, and a capacitive pressure sensor. The capacitive pressure sensor may include at least two parallel plates made of conductive materials. When force is applied to the pressure sensor 180A, capacitance between electrodes changes. The electronic device 100 determines pressure intensity based on the change of the capacitance. When a touch operation is performed on the display 194, the electronic device 100 detects strength of the touch operation by using the pressure sensor 180A. The electronic device 100 may also calculate a touch location based on a detection signal of the pressure sensor 180A. In some embodiments, touch operations that are performed at a same touch location but have different touch operation strength may correspond to different operation instructions. For example, when a touch operation whose touch operation strength is less than a first pressure threshold is performed on an icon of Messages, an instruction for viewing an SMS message is performed. When a touch operation whose touch operation strength is greater than or equal to the first pressure threshold is performed on the icon of Messages, an instruction for creating a new SMS message is performed.

The gyroscope sensor 180B may be configured to determine a motion posture of the electronic device 100. In some embodiments, an angular velocity of the electronic device 100 around three axes (namely, axes x, y, and z) may be determined by using the gyroscope sensor 180B. The gyroscope sensor 180B may be configured to implement image stabilization during photographing. For example, when the shutter is pressed, the gyroscope sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyroscope sensor 180B may also be used in a navigation scenario and a motion-controlled gaming scenario.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall effect sensor. The electronic device 100 may detect opening and closing of a flip cover by using the magnetic sensor 180D. In some embodiments, when the electronic device 100 is a flip phone, the electronic device 100 may detect opening and closing of a flip cover based on the magnetic sensor 180D. Further, a feature such as automatic unlocking upon opening of the flip cover is set based on a detected opening or closing state of the flip cover.

The acceleration sensor 180E may detect magnitudes of accelerations in various directions (usually on three axes) of the electronic device 100, and may detect a magnitude and a direction of gravity when the electronic device 100 is still. The acceleration sensor 180E may be further configured to identify a posture of the electronic device, and is applied to an application such as switching between a landscape mode and a portrait mode or a pedometer.

The range sensor 180F is configured to measure a distance. The electronic device 100 may measure a distance in an infrared or a laser manner. In some embodiments, in a photographing scenario, the electronic device 100 may measure a distance by using the range sensor 180F, to implement quick focusing.

The optical proximity sensor 180G may include, for example, a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear to make a call, to automatically perform screen-off for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 lowers performance of a processor near the temperature sensor 180J, to reduce power consumption for thermal protection. In some other embodiments, when the temperature is less than another threshold, the electronic device 100 heats the battery 142 to prevent the electronic device 100 from being shut down abnormally because of a low temperature. In some other embodiments, when the temperature is less than still another threshold, the electronic device 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 constitute a touchscreen, which is also referred to as a "touchscreen". The touch sensor 180K is configured to detect a touch operation performed on or near the touch sensor 180K. The touch sensor may transfer the detected touch operation to the application processor to determine a type of the touch event. The display 194 may provide a visual output related to the touch operation. In some other embodiments, the touch sensor 180K may alternatively be disposed on a surface of the electronic device 100 at a location different from that of the display 194.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or different types. The SIM card interface 195 is compatible with different types of SIM cards. The SIM card interface 195 is also compatible with an external memory card. The electronic device 100 interacts with a network through the SIM card, to implement functions such as calling and data communication.

Figure 8:
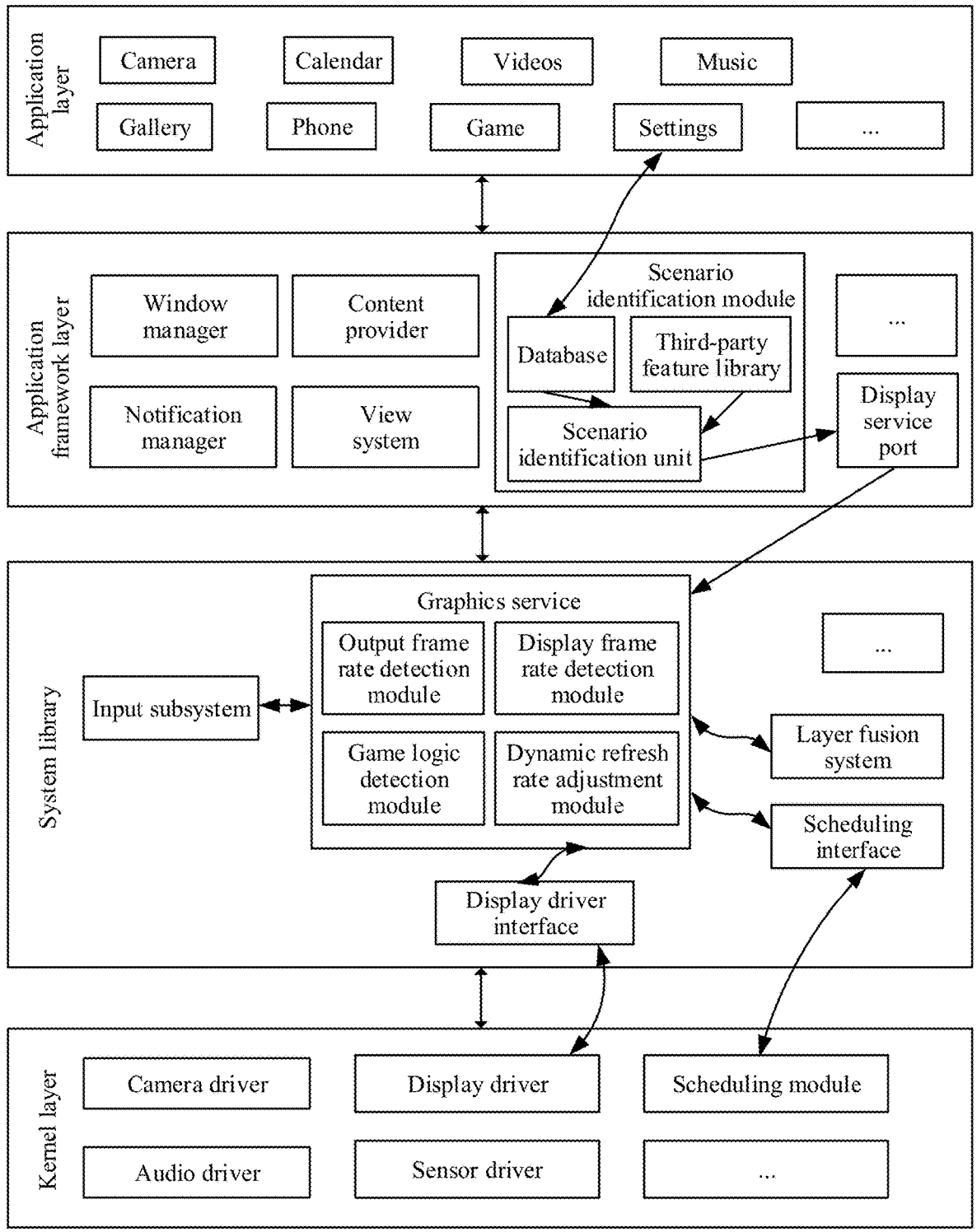
FIG. 8 is a block diagram of a software structure of an electronic device according to an embodiment of this application.

FIG. 8 is a block diagram of a software structure of the electronic device 100 according to this embodiment of this application.

In a layered architecture, software is divided into several layers, and each layer has a clear role and task. The layers communicate with each other through a software interface. In some embodiments, a system is divided into four layers: an application layer, an application framework layer, a system library, and a kernel layer from top to bottom.

The application layer may include a series of application packages.

As shown in FIG. 8, the application packages may include applications (or referred to as applications) such as Camera, Gallery, Calendar, Phone, Maps, Navigation, WLAN, Bluetooth, Music, Videos, Messages, Game, and Settings.

In this embodiment of this application, the user may alternatively set for a daily used screen resolution by using the Settings application, and may further set, by using the Settings application, whether to enable a high refresh rate switching function. When the high refresh rate switching function is enabled, the electronic device performs the refresh rate switching method in the foregoing embodiment. When the high refresh rate switching function is not enabled, the electronic device may not perform the refresh rate switching method in the foregoing embodiment, but refresh a screen by using a fixed screen refresh rate that is set by a manufacturer by default or by the user.

The application framework layer provides an application programming interface (API) and a programming framework for an application at the application layer. The application framework layer includes some predefined functions.

As shown in FIG. 8, the application framework layer may include a window manager, a content provider, a view system, a phone manager, a resource manager, a notification manager, a scenario identification module, an HwAGP, and the like.

The window manager is configured to manage a window program. The window manager may obtain a size of the display, determine whether there is a status bar, perform screen locking, take a screenshot, and the like.

The content provider is configured to: store and obtain data, and enable the data to be accessed by an application. The data may include a video, an image, audio, calls that are made and answered, a browsing history and a bookmark, a phone book, and the like.

The view system includes visual controls, such as a control for displaying a text and a control for displaying a photo. The view system may be configured to construct an application. A display interface may include one or more views. For example, a display interface including an SMS message notification icon may include a text display view and a photo display view.

The phone manager is configured to provide a communication function for the electronic device 100, for example, management of a call status (including answering, declining, or the like).

The resource manager provides various resources such as a localized character string, an icon, a photo, a layout file, and a video file for an application.

The notification manager enables an application to display notification information in a status bar and may be configured to convey a notification type message. The displayed notification information may automatically disappear after a short pause and require no user interaction. For example, the notification manager is configured to notify download completion, give a message notification, and the like. The notification manager may alternatively be a notification that appears in a top status bar of the system in a form of a graph or a scroll bar text, for example, a notification of an application running on the background or a notification that appears on the screen in a form of a dialog interface. For example, text information is prompted in the status bar, an alert sound is played, the electronic device vibrates, or the indicator light blinks.

In this embodiment of this application, the scenario identification module may include a database, a third-party feature library, and a scenario identification unit.

The database may store all setting items in the Settings application and preset setting information before delivery. For example, the database may store the plurality of optional screen refresh rates supported by the electronic device, a screen refresh rate that is preset by the manufacturer and that is used by default, or a daily used screen refresh rate that is set by the user by using the Settings application, information about whether the user enables the high refresh rate switching function, and the like. In this way, after the electronic device is restarted, based on data recorded in the database, the electronic device may be restored to settings before the restart in time.

The third-party feature library records a type of a common application and information about entering or exiting a foreground and background of a currently enabled application.

The scenario identification unit can determine, based on the information in the database and the third-party feature library, a type of an application currently running on the foreground. For example, the application currently running on the foreground is of a game type, or the application currently running on the foreground is of a news type.

A display service port is configured to deliver scenario information determined by the scenario identification module to a display service of the system library. For example, the display service port may be an accelerated graphical port (AGP).

The system library may include a plurality of function modules, configured to provide support for a local service. For example, a layer fusion system (Surface Flinger), an input subsystem (Input Flinger), a graphics service (AGP Service), a display driver interface, and a scheduling interface.

The input subsystem is configured to detect a user input, for example, a tap or slide operation of the user. For example, the input subsystem delivers a down event, a move event, and an up event based on operations performed by the user on the touchscreen. The down event may be understood as starting to touch a screen, the move event indicates that a hand touches the screen and does not leave the screen, and the up event indicates that the hand touches the screen and leaves the screen.

The layer fusion system is configured to manage a display subsystem and provide fusion of two-dimensional (2-Dimensional, 2D) and three-dimensional (3-Dimensional, 3D) layers for a plurality of applications. In one embodiment, the layer fusion system may receive layer data that needs to be displayed and that is sent by each application, and the layer fusion system may send, to the graphics service, time information of sending, by the application, the layer data that needs to be displayed.

The graphics service is used to determine a current scenario based on received information, and provide a corresponding graphics display policy service. The graphics service may include an output frame rate detection module, a game logic detection module, a display frame rate detection module, and a dynamic refresh rate adjustment module.

The output frame rate detection module is configured to detect an output frame rate of a foreground application in real time.

The display frame rate detection module is configured to detect a display frame rate of a current display image on the display.

The game logic detection module is configured to: when a type of a current foreground application delivered by the scenario identification module through the display service port is a game type, and the output frame rate detection module detects that an increase in an output frame rate of the application exceeds a preset threshold, determine that a current scenario is a game scenario.

The dynamic refresh rate adjustment module is configured to determine, based on information transmitted by the game logic detection module, the display frame rate detection module, or the input subsystem, a corresponding current screen refresh rate according to the refresh rate switching method in the foregoing embodiment.

For example, if data delivered by the display service port and received by the graphics service indicates that a current foreground is a game-type application, the output frame rate detection module in the graphics service detects that an output frame rate of the application increases from 60 FPS to 90 FPS. This exceeds a preset threshold 20 FPS, so that the game logic detection module determines that a current interface is a game scenario. The dynamic refresh rate adjustment module adjusts the current screen refresh rate to a highest screen refresh rate of 120 Hz. The display frame rate detection module detects that a current display frame rate is 86 FPS. The dynamic refresh rate adjustment module determines that the current display frame rate does not match the current screen refresh rate, adjusts the current screen refresh rate to a next screen refresh rate of the plurality of optional screen refresh rates, 90 Hz, as the current screen refresh rate. The display frame rate detection module detects that the current display frame rate is 87 FPS. The dynamic refresh rate adjustment module determines that the current display frame rate matches the current screen refresh rate, and maintains the current screen refresh rate as 90 Hz.

For example, if it is detected that the user touches the screen, the input subsystem delivers a down event to the graphics service. After receiving the down event, the dynamic refresh rate adjustment module in the graphics service determines that a touch operation is detected, and improves a current screen resolution to the highest resolution. The input subsystem detects that the user is off the screen, and delivers an up event to the graphics service. After receiving the up event, the dynamic refresh rate adjustment module determines that it is detected that the touch operation leaves, and starts a countdown timer whose preset duration is 5 seconds. Before the countdown ends, if time information, sent by the layer fusion system, of the layer data that needs to be displayed and is sent by the current foreground application is not received continuously for one second, the dynamic refresh rate adjustment module confirms that an image stagnates in refreshing, and adjusts the current screen refresh rate to a default refresh rate set by the user and stored in the database.

The scheduling interface may deliver a current refresh rate determined by the graphics service to a scheduling module at the kernel layer.

The display driver interface may deliver the current refresh rate determined by the graphics service to a display driver at the kernel layer.

The kernel layer is a layer between hardware and software. The kernel layer includes at least a display driver, a camera driver, an audio driver, a sensor driver, and the scheduling module.

After receiving the current screen refresh rate delivered by the scheduling interface of the system library, the scheduling module adjusts a corresponding scheduling policy based on the current screen refresh rate, and correspondingly schedules hardware such as a CPU and the GPU.

After receiving the current screen refresh rate sent by the display driver interface, the display driver drives the display to refresh the display based on the current screen refresh rate.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

According to the context, the term "when" used in the foregoing embodiments may be interpreted as a meaning of "if", "after", "in response to determining", or "in response to detecting". Similarly, according to the context, the phrase "when it is determined that" or "if (a stated condition or event) is detected" may be interpreted as a meaning of "if it is determined that", "in response to determining", "when (a stated condition or event) is detected", or "in response to detecting (a stated condition or event)".

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on a computer, a procedure or function according to embodiments of this application is all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

Persons of ordinary skill in the art may understand that all or some of the procedures of the methods in embodiments may be implemented by a computer program instructing related hardware. The program may be stored in the computer-readable storage medium. When the program is executed, the procedures in the method embodiments may be included. The foregoing storage medium includes any medium that can store program code, such as a ROM, a random access memory RAM, a magnetic disk, or an optical disc.

What is claimed is:

1. A refresh rate switching method, comprising:
  refreshing, by an electronic device, a display by using a first refresh rate, wherein the first refresh rate is not a highest screen refresh rate of a plurality of optional screen refresh rates of the electronic device; and
  when the electronic device determines that a display image is a game scenario, determining, by the electronic device, one screen refresh rate from the plurality of optional screen refresh rates as a second refresh rate according to the following operations, and refreshing the display by using the second refresh rate:
  setting, by the electronic device, the second refresh rate to the highest screen refresh rate;
  when determining that the second refresh rate is not the first refresh rate, determining, by the electronic device, whether a current display frame rate matches the second refresh rate, wherein the current display frame rate is a display frame rate of a display image that is detected after the display is refreshed by using the second refresh rate;
  when determining that the current display frame rate does not match the second refresh rate, updating, by the electronic device, the second refresh rate to a next screen refresh rate of the plurality of optional screen refresh rates in a descending order of screen refresh rates; and
  when determining that the current display frame rate matches the second refresh rate or determining that the second refresh rate is the first refresh rate, maintaining, by the electronic device, a screen refresh rate as the second refresh rate.

2. The method according to claim 1, wherein each of the plurality of optional screen refresh rates corresponds to a frame rate range; and
  the determining, by the electronic device, whether a current display frame rate matches the second refresh rate comprises:
  determining, by the electronic device, whether the current display frame rate belongs to a frame rate range corresponding to the second refresh rate; and
  when determining that the current display frame rate belongs to the frame rate range corresponding to the second refresh rate, determining, by the electronic device, that the current display frame rate matches the second refresh rate.

3. The method according to claim 1, wherein each of the plurality of optional screen refresh rates corresponds to a frame rate range; and
  the determining, by the electronic device, whether a current display frame rate matches the second refresh rate comprises:
  determining, by the electronic device, whether the current display frame rate belongs to a frame rate range corresponding to the second refresh rate; and
  when determining that the current display frame rate does not belong to the frame rate range corresponding to the second refresh rate, determining, by the electronic device, that the current display frame rate does not match the second refresh rate.

4. The method according to claim 1, wherein the determining, by the electronic device, whether a current display frame rate matches the second refresh rate comprises:
  determining, by the electronic device, whether a difference between a value of the second refresh rate and a value of the current display frame rate is less than a preset difference; and when determining that the difference is less than the preset difference, determining, by the electronic device, that the current display frame rate matches the second refresh rate.

5. The method according to claim 1, wherein the determining, by the electronic device, whether a current display frame rate matches the second refresh rate comprises:
determining, by the electronic device, whether a difference between a value of the second refresh rate and a value of the current display frame rate is less than a preset difference; and
when determining that the difference is not less than the preset difference, determining, by the electronic device, that the current display frame rate does not match the second refresh rate.

6. The method according to claim 1, wherein the method further comprises:
determining, by the electronic device, whether a type of an application currently running on a foreground is a game type;
determining, by the electronic device, whether an increase in an output frame rate of the application exceeds a preset threshold; and
when determining that the type of the application currently running on the foreground is the game type and the increase in the output frame rate of the application exceeds the preset threshold, determining, by the electronic device, that the display image is the game scenario.

7. The method according to claim 1, wherein the plurality of optional screen refresh rates comprises two screen refresh rates: a lowest screen refresh rate and the highest screen refresh rate; and the first refresh rate is the lowest screen refresh rate.

8. The method according to claim 1, wherein the plurality of optional screen refresh rates comprises more than two screen refresh rates; and
the first refresh rate is a lowest screen refresh rate of the plurality of optional screen refresh rates; or the first refresh rate is a screen refresh rate other than the highest screen refresh rate and the lowest screen refresh rate of the plurality of optional screen refresh rates.

9. An electronic device comprising;
a display;
one or more processors;
a memory; and
a plurality of applications, and one or more computer programs, wherein the one or more computer programs are stored in the memory, the one or more computer programs comprise instructions, and when the instructions are executed by the one or more processors of the electronic device, the electronic device is enabled to perform the following operations:
refreshing the display by using a first refresh rate, wherein the first refresh rate is not a highest screen refresh rate of a plurality of optional screen refresh rates of the electronic device; and
when determining that a display image is a game scenario, determining one screen refresh rate from the plurality of optional screen refresh rates as a second refresh rate according to the following operations, and refreshing the display by using the second refresh rate:
setting the second refresh rate to the highest screen refresh rate;
when determining that the second refresh rate is not the first refresh rate, determining whether a current display frame rate matches the second refresh rate, wherein the current display frame rate is a display frame rate of a display image that is detected after the display is refreshed by using the second refresh rate;
when determining that the current display frame rate does not match the second refresh rate, updating the second refresh rate to a next screen refresh rate of the plurality of optional screen refresh rates in a descending order of screen refresh rates; and
when determining that the current display frame rate matches the second refresh rate or determining that the second refresh rate is the first refresh rate, maintaining a screen refresh rate as the second refresh rate.

10. The electronic device according to claim 9, wherein each of the plurality optional screen refresh rates corresponds to a frame rate range, and when the instructions are executed by the electronic device, the electronic device is enabled to perform the following operations:
determining whether the current display frame rate belongs to a frame rate range corresponding to the second refresh rate; and
when determining that the current display frame rate belongs to the frame rate range corresponding to the second refresh rate, determining that the current display frame rate matches the second refresh rate; or
when determining that the current display frame rate does not belong to the frame rate range corresponding to the second refresh rate, determining that the current display frame rate does not match the second refresh rate.

11. The electronic device according to claim 9, wherein each of the plurality optional screen refresh rates corresponds to a frame rate range, and when the instructions are executed by the electronic device, the electronic device is enabled to perform the following operations:
determining whether the current display frame rate belongs to a frame rate range corresponding to the second refresh rate; and
when determining that the current display frame rate belongs to the frame rate range corresponding to the second refresh rate, determining that the current display frame rate matches the second refresh rate.

12. The electronic device according to claim 9, wherein when the instructions are executed by the electronic device, the electronic device is enabled to perform the following operations:
determining whether a difference between a value of the second refresh rate and a value of the current display frame rate is less than a preset difference; and
when determining that the difference is less than the preset difference, determining that the current display frame rate matches the second refresh rate; or
when determining that the difference is not less than the preset difference, determining that the current display frame rate does not match the second refresh rate.

13. The electronic device according to claim 9, wherein when the instructions are executed by the electronic device, the electronic device is enabled to specifically perform the following operations:
determining whether a difference between a value of the second refresh rate and a value of the current display frame rate is less than a preset difference; and
when determining that the difference is not less than the preset difference, determining that the current display frame rate does not match the second refresh rate.

14. The electronic device according to claim 9, wherein when the instructions are executed by the electronic device, the electronic device is enabled to further perform the following operations:

determining whether a type of an application currently running on a foreground is a game type;

determining whether an increase in an output frame rate of the application exceeds a preset threshold; and when determining that the type of the application currently running on the foreground is the game type and the increase in the output frame rate of the application exceeds the preset threshold, determining that the display image is the game scenario.

15. The electronic device according to claim 9, wherein the plurality of optional screen refresh rates comprises two screen refresh rates: a lowest screen refresh rate and the highest screen refresh rate; and the first refresh rate is the lowest screen refresh rate.

16. The electronic device according to claim 9, wherein the plurality of optional screen refresh rates comprises more than two screen refresh rates; and the first refresh rate is a lowest screen refresh rate of the plurality of optional screen refresh rates; or the first refresh rate is a screen refresh rate other than the highest screen refresh rate and the lowest screen refresh rate of the plurality of optional screen refresh rates.

\* \* \* \* \*